(12) United States Patent
Dewar

(10) Patent No.: US 11,456,939 B2
(45) Date of Patent: Sep. 27, 2022

(54) APPARATUS, COMPUTER PROGRAM AND METHOD

(71) Applicant: IPCO 2012 LIMITED, London (GB)

(72) Inventor: Michael Alan Dewar, Richmond (GB)

(73) Assignee: IPCO 2012 LIMITED, London (GB)

( * ) Notice: Subject to any disclaimer, the term of this patent is extended or adjusted under 35 U.S.C. 154(b) by 455 days.

(21) Appl. No.: 16/584,496

(22) Filed: Sep. 26, 2019

(65) Prior Publication Data
US 2020/0106689 A1 Apr. 2, 2020

(30) Foreign Application Priority Data

Sep. 28, 2018 (EP) .................................... 18197516

(51) Int. Cl.
| | |
|---|---|
| *H04L 43/10* | (2022.01) |
| *G06Q 30/00* | (2012.01) |
| *H04L 69/28* | (2022.01) |
| *G06Q 20/40* | (2012.01) |

(52) U.S. Cl.
CPC ......... *H04L 43/10* (2013.01); *G06Q 20/4016* (2013.01); *G06Q 30/018* (2013.01); *H04L 69/28* (2013.01)

(58) Field of Classification Search
CPC ..... H04L 43/10; H04L 69/28; G06Q 20/4016; G06Q 30/018
See application file for complete search history.

(56) References Cited

U.S. PATENT DOCUMENTS

| | | | |
|---|---|---|---|
| 7,249,094 B2 | 7/2007 | Levchin et al. | |
| 8,223,785 B2 * | 7/2012 | Herrmann | H04W 4/00 370/412 |
| 9,871,713 B2 * | 1/2018 | Forsberg | H04L 65/1069 |
| 10,523,548 B2 * | 12/2019 | Lyra | H04L 49/90 |
| 2016/0364794 A1 | 12/2016 | Chari et al. | |

FOREIGN PATENT DOCUMENTS

| | | |
|---|---|---|
| WO | 03077181 | 9/2003 |
| WO | 2018150161 | 8/2018 |

OTHER PUBLICATIONS

European Search Report from European Patent Application No. 18197516.0 entitled An Apparatus Computer Program and Method (dated Feb. 26, 2019).
Xiong, Jintao Article "ACT: Attachment Chain Tracing Scheme for Email Virus Detection and Control" (dated Oct. 29, 2004).
PCT International Search Report and Written Opinion from PCT Application No. PCT/EP2019/075024 entitled An Apparatus, Computer Program and Method (dated Oct. 9, 2019).

* cited by examiner

*Primary Examiner* — Chandrahas B Patel
(74) *Attorney, Agent, or Firm* — Hovey Williams LLP

(57) ABSTRACT

A method of tracing messages through a network of nodes is provided, the method comprising receiving message information corresponding to a first outbound message, the message information comprising a first source identifier and a first destination identifier and determining whether the first source identifier is associated with a set of messages in a storage unit, whereby when the first source identifier is associated with a set of messages, the method comprises producing a trace request, the trace request comprising the first destination identifier and an identifier identifying the set of messages associated with the first source identifier.

19 Claims, 14 Drawing Sheets

APPARATUS, COMPUTER PROGRAM AND METHOD

CROSS REFERENCE TO RELATED APPLICATIONS

This application claims priority to European Application Serial No. 18197516.0, filed Sep. 28, 2018, which is incorporated herein by reference in its entirety

BACKGROUND

Field of the Disclosure

The present technique relates to an apparatus, computer program and method.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present technique.

Banking fraud and scamming is an increasing problem. In a typical fraud or scam, a perpetrator of the fraud will illegally obtain funds from a victim's bank account. This may be via a "phishing" or "malware" attack where access to the victim's bank facilities is obtained. For example a perpetrator of the fraud or scam may access a victim's account or deceptively obtain funds via the victim transferring funds into the perpetrator's bank account.

After the funds have been transferred from the victim's account, the perpetrator will transfer funds through numerous other bank accounts. These other bank accounts may be legitimate accounts which have also been compromised, bank accounts set up using illegally obtained documents (such as a stolen or fake passport), or may be rented from a $3^{rd}$ party to be used for illicit purposes.

The speed at which the funds are transferred is usually very high. Typically, a transfer between multiple banks' accounts may be completed within a few minutes.

This transfer of funds occurs for two reasons. The first reason is to make tracing the funds very complicated. This is because investigation is done manually using the limited view of data from each bank on a bank by bank basis. Therefore, it is difficult to trace the movements of funds originating from the initial fraudulent transaction across the banking network. This is especially the case where the funds obtained from the victim are typically mixed with other funds in each bank account (some legitimate funds and some illegitimate funds). This makes tracing the funds incredibly difficult.

The second reason is to disperse the money in the original transaction. This allows the perpetrator to, for example, withdraw small amounts of money as cash from e.g. an Automated Teller Machine (ATM) or to buy lower value products in a shop without arousing suspicion.

In some instances, some money from a fraudulent transaction may pass through tens of bank accounts in a few hours. This number of accounts and the speed at which the funds transfer makes tracing the funds using conventional mechanisms impossible. It is an aim of the disclosure to address these issues.

SUMMARY

A method of tracing messages through a network of nodes is provided, the method comprising receiving message information corresponding to a first outbound message, the message information comprising a first source identifier and a first destination identifier and determining whether the first source identifier is associated with a set of messages in a storage unit, whereby when the first source identifier is associated with a set of messages, the method comprises producing a trace request, the trace request comprising the first destination identifier and an identifier identifying the set of messages associated with the first source identifier.

An apparatus for building a set of traceable messages through a network of nodes is provided, the apparatus comprising communication circuitry configured to receive message information corresponding to a first outbound message, the message information comprising a first source identifier and a first destination identifier and processing circuitry configured to determine whether the first source identifier is associated with a set of messages in a storage unit, whereby when the first source identifier is associated with a set of messages, the processing circuitry is configured to produce a trace request, the trace request comprising the first destination identifier and an identifier identifying the set of messages associated with the first source identifier.

A computer program product comprising instructions which, when the program is executed by a computer, cause the computer to carry out a method of tracing messages through a network of nodes is provided, the method comprising receiving message information corresponding to a first outbound message, the message information comprising a first source identifier and a first destination identifier and determining whether the first source identifier is associated with a set of messages in a storage unit, whereby when the first source identifier is associated with a set of messages, the method comprises producing a trace request, the trace request comprising the first destination identifier and an identifier identifying the set of messages associated with the first source identifier.

According to embodiments of the disclosure, all those accounts and transactions associated with the fraudulent activity can be traced quickly and substantially in real time without the requirement for a central database, increasing the level of privacy and network security.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Each of FIGS. 7A, 7B, 7C and 7D illustrates a set of exemplary messages according to an embodiment of the disclosure.

Figure 8:
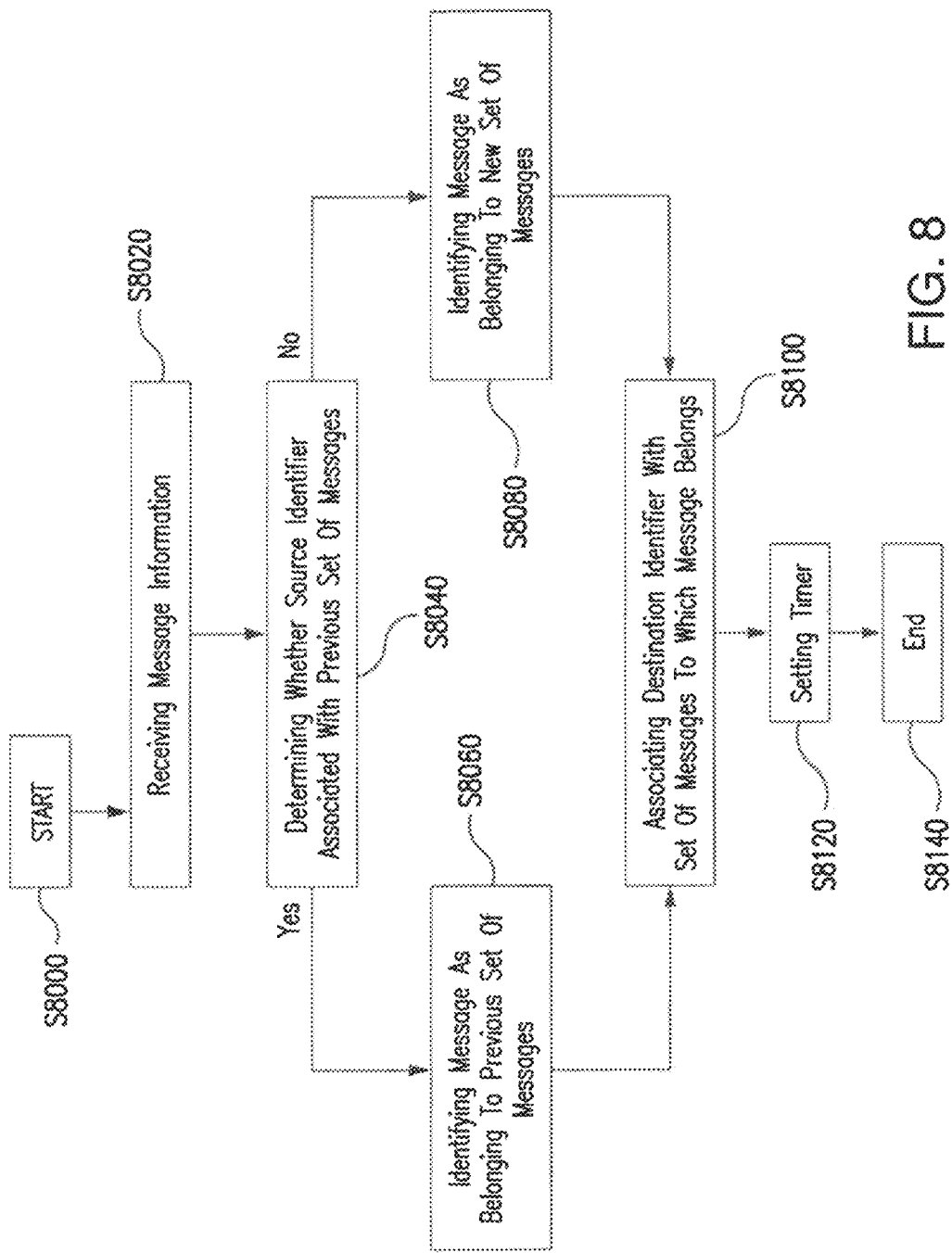

FIG. 8 illustrates a method of building a set of traceable messages through a network of nodes according to an embodiment of the disclosure.

Figure 9:
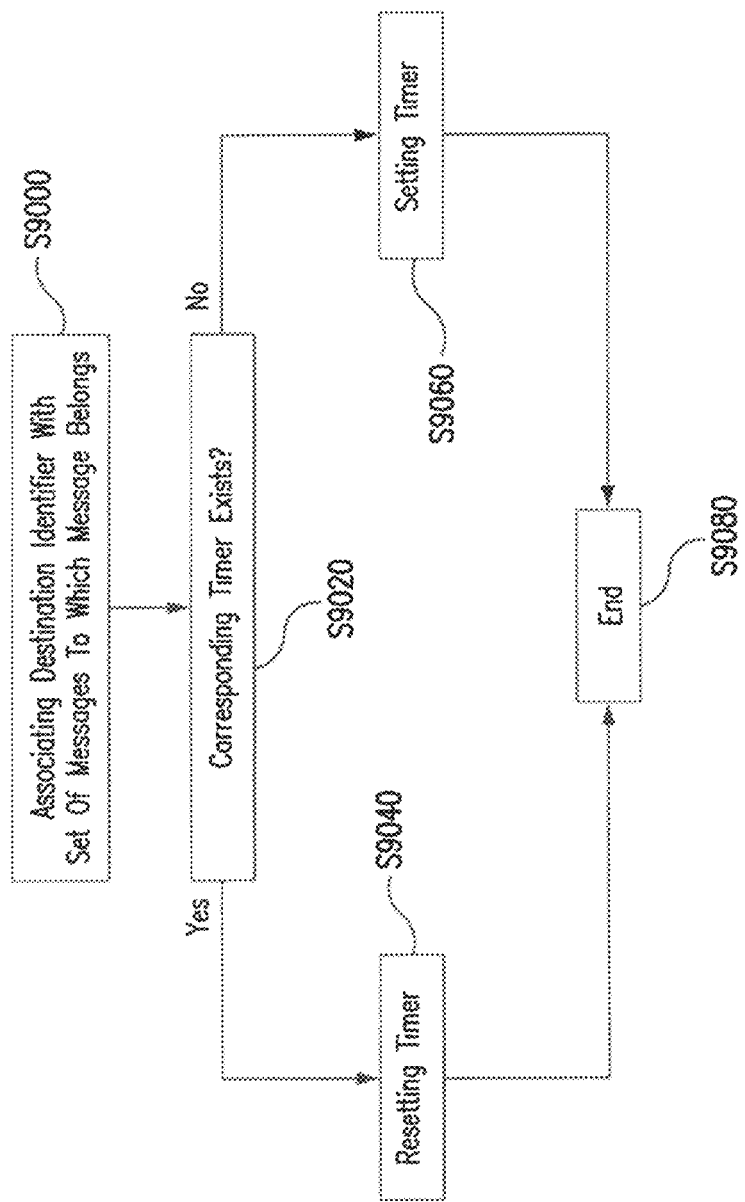

FIG. 9 illustrates a method of building a set of traceable messages through a network of nodes according to an embodiment of the disclosure.

Figure 10:
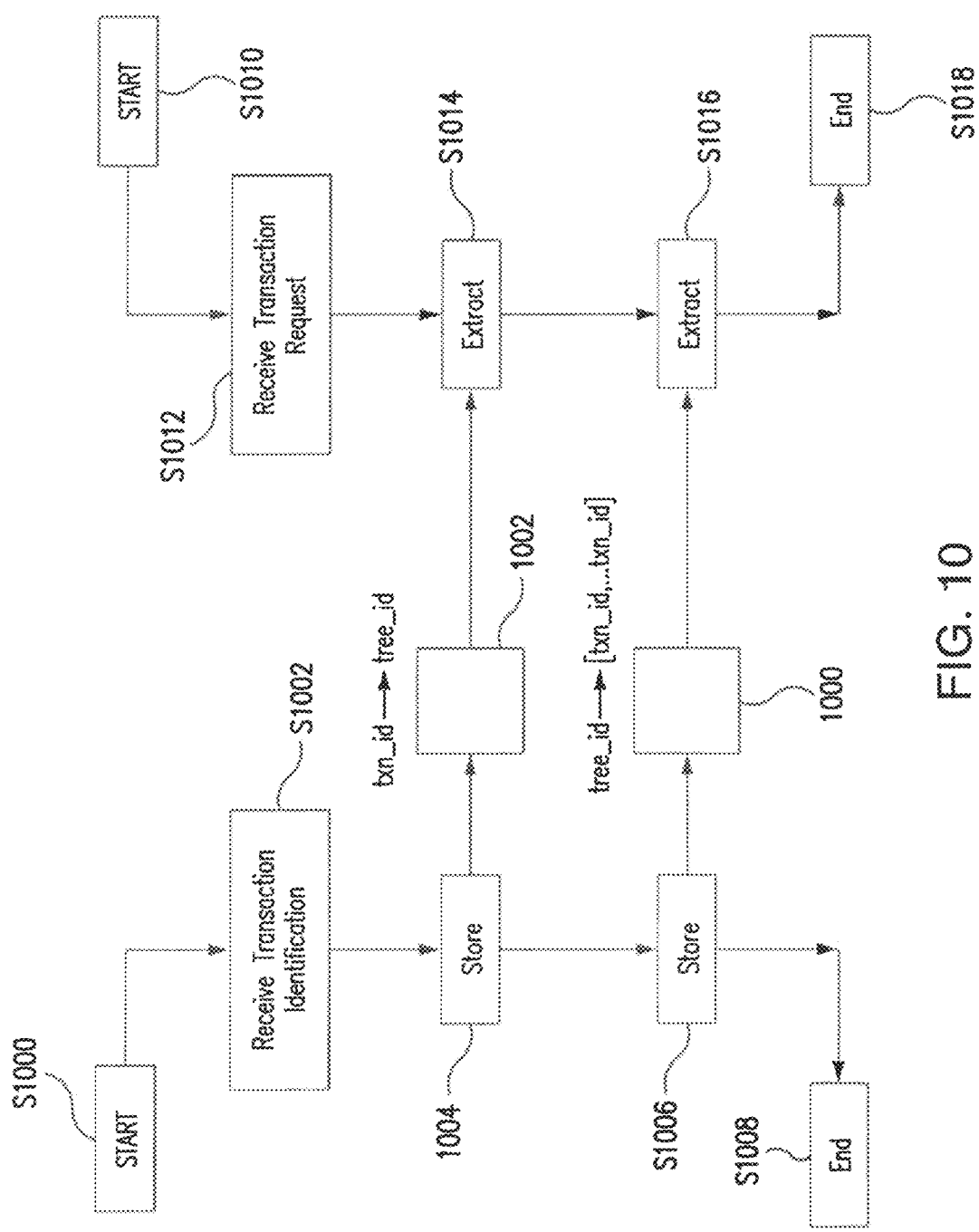

FIG. 10 illustrates a method of storing and retrieving transaction identification according to an embodiment of the disclosure.

Figure 11:
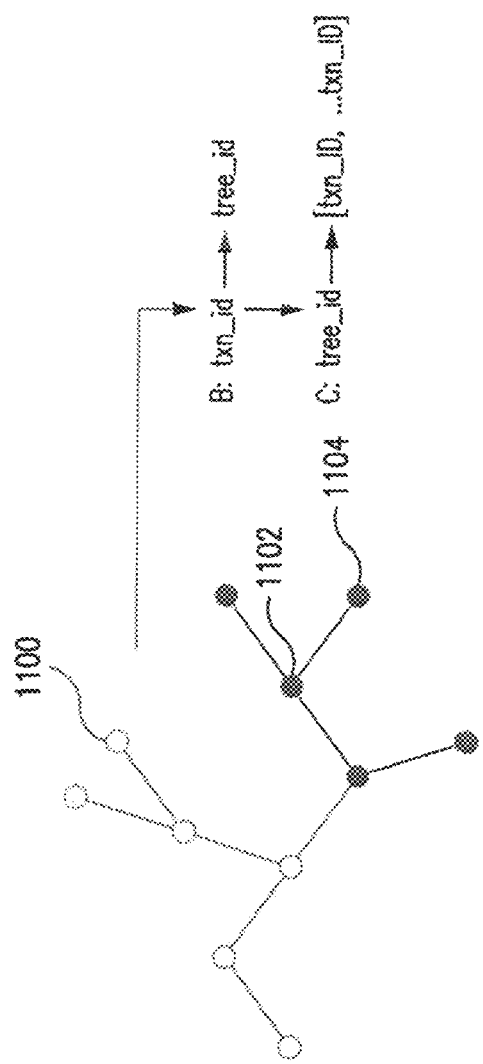

FIG. 11 illustrates a series of transactions between bank accounts which have been processed into a set of dispersion trees according to an embodiment of the disclosure.

Figure 12:
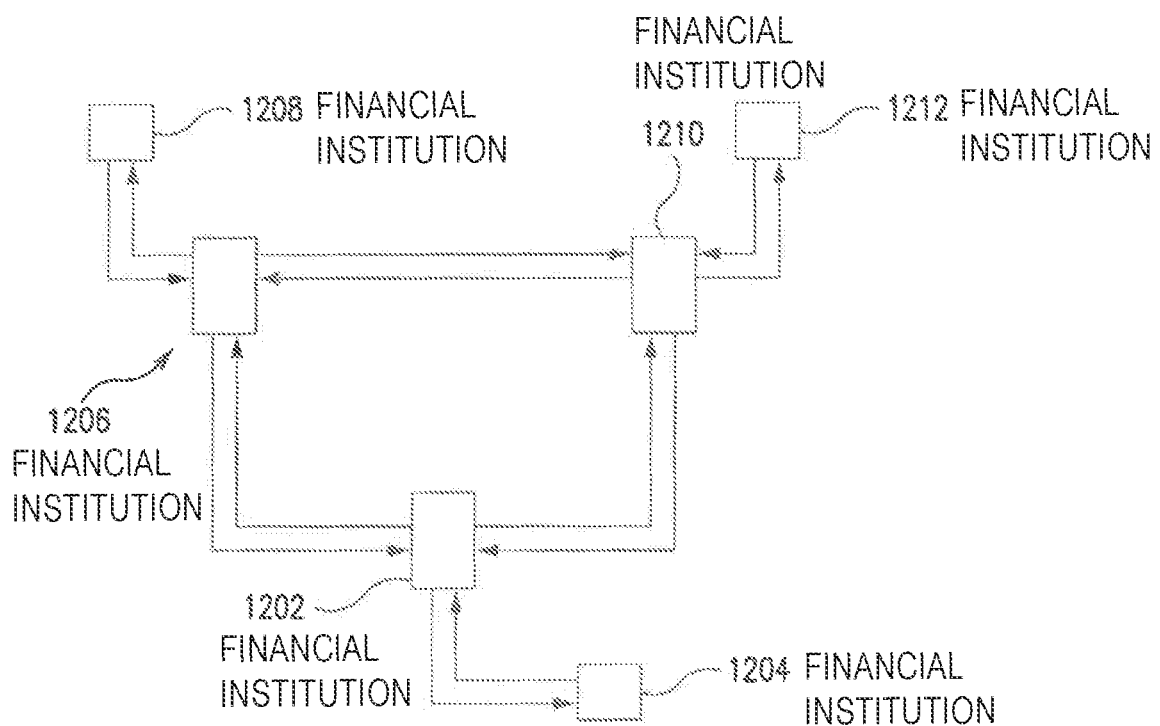

FIG. 12 illustrates an exemplary application of the method of tracing messages through a network of nodes according to an embodiment of the disclosure.

Figure 13:
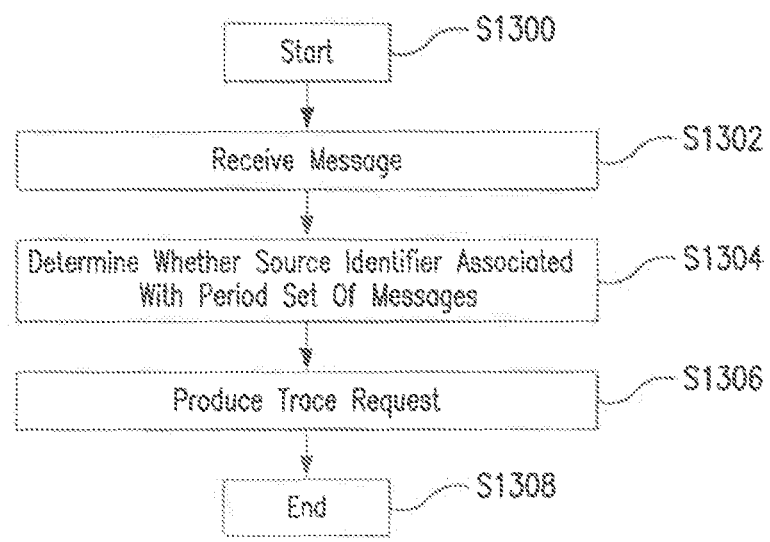

FIG. 13 illustrates a method of tracing messages through a network of nodes according to an embodiment of the disclosure.

Figure 14:
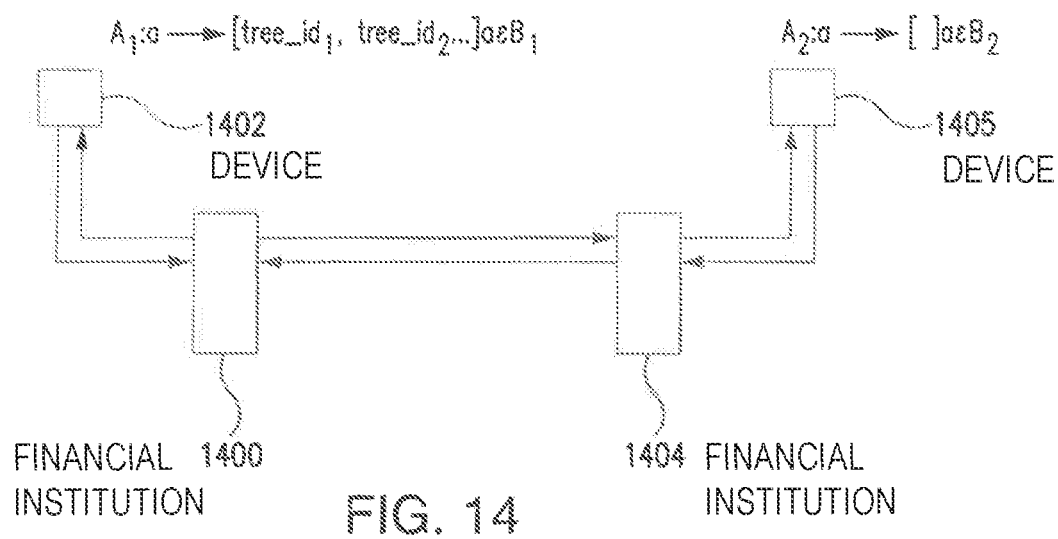

FIG. 14 illustrates an exemplary transaction between two financial institutions according to an embodiment of the disclosure.

Figure 15:
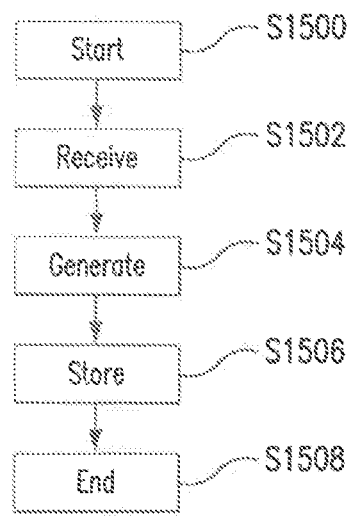

FIG. 15 illustrates a method of initiating a trace request according to an embodiment of the disclosure.

DESCRIPTION OF THE EMBODIMENTS

Referring now to the drawings, wherein like reference numerals designate identical or corresponding parts throughout the several views.

Figure 1:
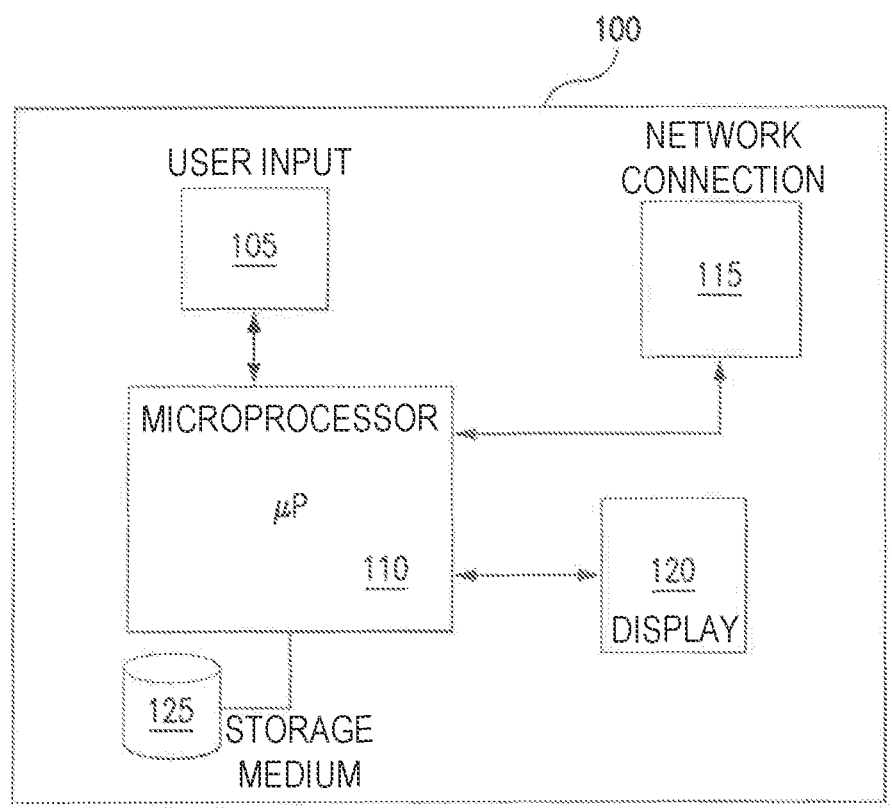
FIG. 1 shows an apparatus according to embodiments of the present disclosure.

Referring to FIG. 1, an apparatus 100 according to embodiments of the disclosure is shown. Typically, an apparatus 100 according to embodiments of the disclosure is a computer device such as a personal computer or a terminal connected to a server. Indeed, in embodiments, the apparatus may also be a server. The apparatus 100 is controlled using a microprocessor or other processing circuitry 110.

The processing circuitry 110 may be a microprocessor carrying out computer instructions or may be an Application Specific Integrated Circuit. The computer instructions are stored on storage medium 125 which maybe a magnetically readable medium, optically readable medium or solid state type circuitry. The storage medium 125 may be integrated into the apparatus 100 or may be separate to the apparatus 100 and connected thereto using either a wired or wireless connection. The computer instructions may be embodied as computer software that contains computer readable code which, when loaded onto the processor circuitry 110, configures the processor circuitry 110 to perform a method according to embodiments of the disclosure.

Additionally connected to the processor circuitry 110, is a user input 105. The user input maybe a touch screen or maybe a mouse or stylist type input device. The user input 105 may also be a keyboard or any combination of these devices.

A network connection 115 is also coupled to the processor circuitry 110. The network connection 115 may be a connection to a Local Area Network or a Wide Area Network such as the Internet or a Virtual Private Network or the like. The network connection 115 may be connected to banking infrastructure allowing the processor circuitry 110 to communicate with other banking institutions to obtain relevant data or provide relevant data to the institutions. The network connection 115 may therefore be behind a firewall or some other form of network security.

Additionally coupled to the processing circuitry 110, is a display device 120. The display device, although shown integrated into the apparatus 100, may additionally be separate to the apparatus 100 and maybe a monitor or some kind of device allowing the user to visualize the operation of the system. In addition, the display device 120 may be a printer or some other device allowing relevant information generated by the apparatus 100 to be viewed by the user or by a third party.

Figure 2A:
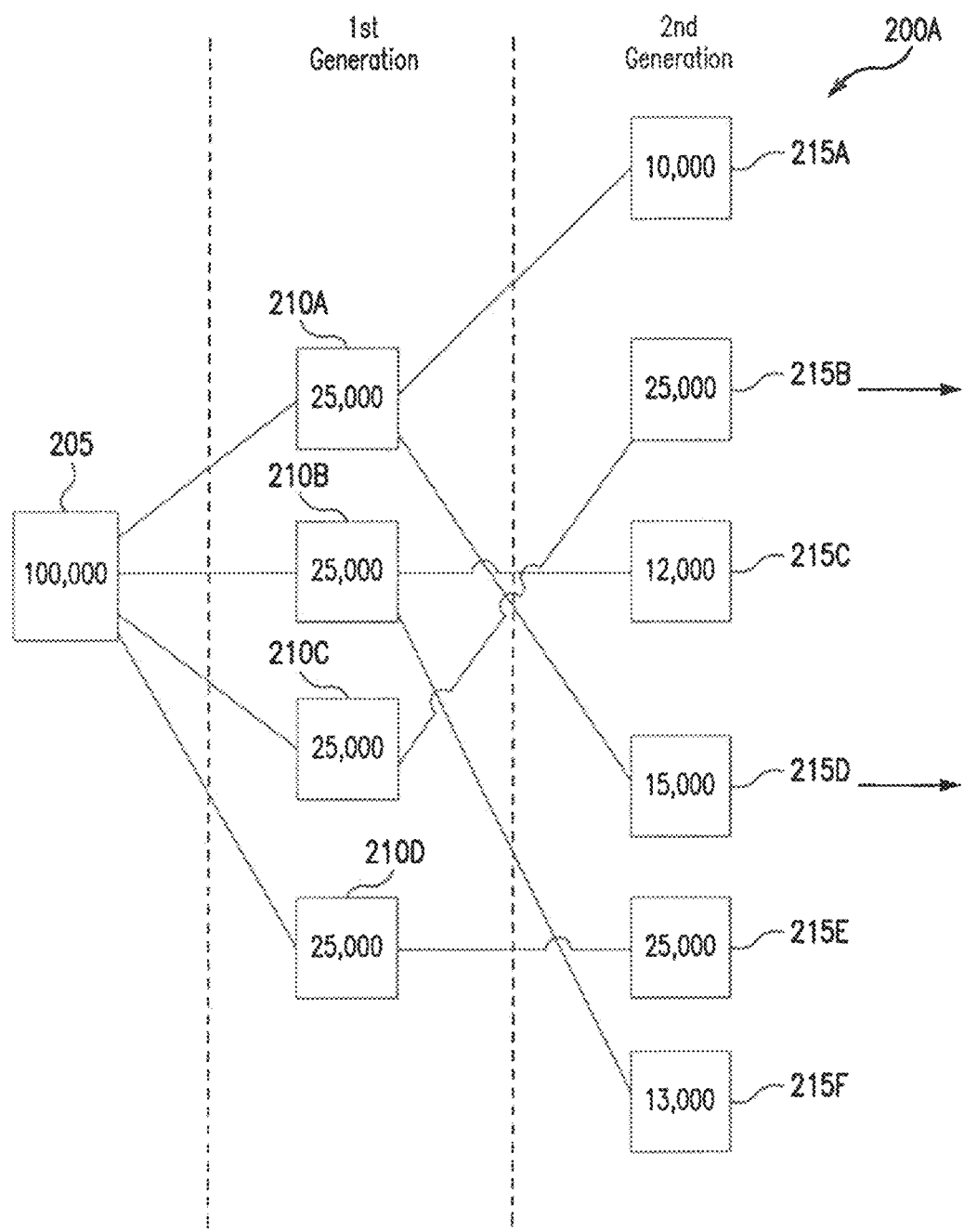
FIGS. 2A and 2B show a schematic diagram of a fraudulent transaction.
Figure 2B:
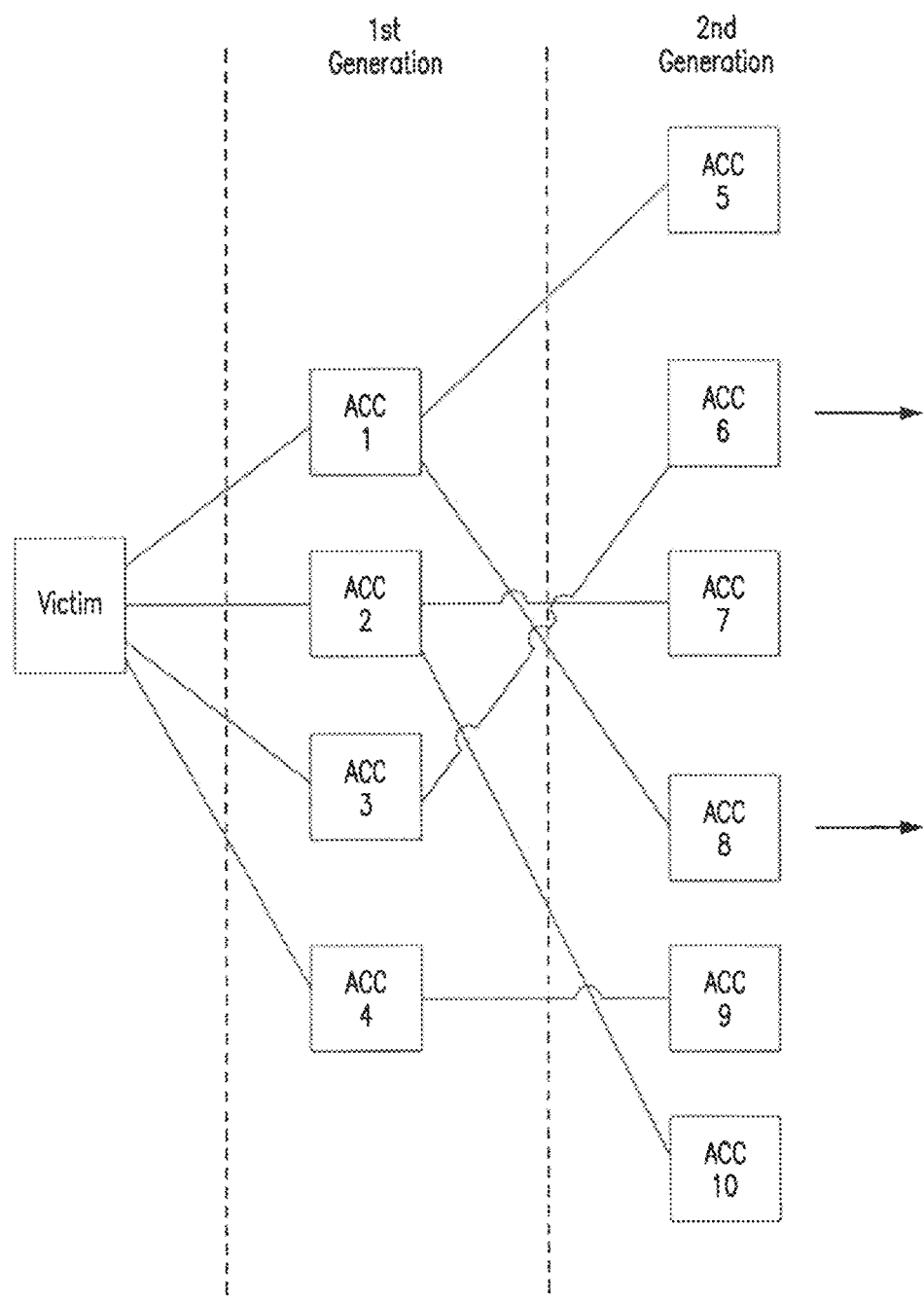

Referring to FIGS. 2A-2B, a schematic diagram showing a fraudulent transaction is shown.

The embodiments of the present disclosure aim to trace the flow of funds subsequent to a fraudulent transaction. In particular, one aim of the present disclosure is to trace the funds in a very efficient and quick manner. This is important given the number of bank accounts through which the fraudulently obtained money flows and the speed at which the money flows the various accounts in a fraudster's network as well as the high number of non-fraud accounts that funds may flow to. This enables the possible recovery of the money and importantly the closure of bank accounts associated with fraudulent activity in a timely fashion.

In FIG. 2A, a chart showing the dispersal of money from a fraudulent activity is shown. In particular, a victim 205 has £100,000 stolen from their account using fraudulent means. For example, a fraudster may use one of a myriad of techniques in order to comprise the security of the account. The fraudster may contact the victim reporting to be a bank employee and to fraudulently obtain secret information which then allows the fraudster to illegally transfer £100,000 from the victim's account.

Typically, the fraudster will utilize a transaction which allows money to be transferred between various bank accounts very quickly and within a matter of seconds or minutes.

In the example of FIG. 2A, the fraudster transfers the £100,000 of the victim's money as four transactions each of £25,000. In FIG. 2A, this is illustrated with £25,000 being allocated to account 1 210A, account 2 210B, account 3 210C, and account 4 210D. These accounts may be in the same banking organization or may be different banking organizations. Typically, this fraudulently obtained money may be mixed with other money located in the respective bank accounts. The other money in the respective bank accounts may be legitimate money or other fraudulent money. These bank accounts are the first generation of bank accounts associated with the fraudulent activity.

Within a few minutes of the money reaching the bank accounts in the first generation of accounts, the fraudsters then transfer the money to different bank accounts which are termed second generation bank accounts. In the example of FIG. 2A, the fraudsters transfer £10,000 from account 1 210A to account 5 215A and £15,000 to account 8 215D. Similarly, the fraudsters transfer £12,000 from account 2 210B to account 7 215C and £13,000 to account 10 215F. The fraudsters transfer £25,000 from account 3 210C transfers to account 6 215B. Finally, the fraudsters transfer £25,000 from account 4 210D to account 9 215E.

As with the first generation bank accounts, each of the second generation bank accounts 215A-215F may be with the same or different banking organizations.

The process of transferring the money away then continues for possibly many generations of bank accounts. The purpose of the distribution of the money to various bank accounts is so that at a final step, the terminating bank accounts usually have smaller quantities of cash which may be extracted using an Automatic Teller Machine (ATM) or may be used to purchase goods from a shop without arousing suspicion or extracted from the terminating bank account in some way. Nevertheless, given the speed at which the money can be distributed between fraudulent accounts, the initial £100,000 stolen from victim 205 may be extracted and used within a few hours of the initial fraudulent transaction.

It is important to note that this does not mean that the first generation bank accounts or the second generation bank accounts have no money remaining after the transfer. Typically, the fraudster will use bank accounts having some other funds (either legitimate or illegitimate). This makes it very difficult to identify which of the money passed to the second generation bank account is associated with the initial fraudulent activity. It is therefore important to identify the bank accounts associated with fraudulent activity very quickly so that those accounts can be closed to frustrate the fraudster from performing similar fraudulent transactions.

This is especially the case since the transfer from the first generation bank accounts to the second generation bank accounts is usually carried out very quickly and within minutes of the initial fraudulent activity 205.

Tracing this stolen money is very difficult using known techniques. This is because banks will typically only see money entering one account and leaving the same account a short time later; there is no indication to the bank that these transactions are linked. Additionally, as banking regulations are very tightly controlled, it is difficult to obtain information pertaining to an individual's bank account. This means tracking the money after the fraudulent activity has taken place can be very difficult. This is especially the case if the bank accounts in the fraudulent network are located in different countries.

FIG. 2B shows the network of accounts associated with the fraudulent transaction in FIG. 2A.

From FIG. 2B, it will be apparent to the skilled person in the art, that the victim bank account is a root node of a network. Each bank account within the network is therefore a node of the network. The transaction transferring the money is therefore an edge of the network. This means that the skilled person in the art may consider the network as a graph and, therefore, may implement graph theory in analyzing the network.

Figure 3:
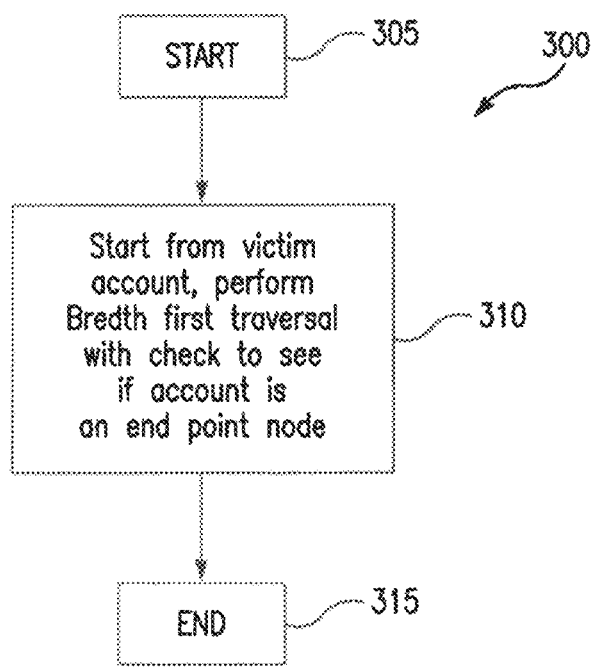
FIG. 3 shows a flow chart according to embodiments.

FIG. 3 shows a flowchart explaining embodiments of the disclosure used to trace this fraudulent activity very quickly. The flowchart 300 starts at the start block 305. The process moves to step 310. In step 310, a Breadth-First traversal of the network is carried out. In this type of traversal, the root node is processed first, then all of its children are processed next and then all of the children's children are processed next. In this traversal, in embodiments, a check is conducted at each node (bank account). This check determines whether the node is an end-point node. In other words, the check determines if the node is part of the fraudulent dispersal. The check of one account, according to embodiments, will be described with reference FIG. 4.

A brief description will follow set in the context of the embodiments of FIG. 2B.

The initiating fraudulent transaction from the victim account (the root node) to "Acc 1", "Acc 2", "Acc 3" and "Acc 4" (nodes) of FIG. 2B is tracked. At each of these nodes, the check of FIG. 4 is carried out as will be explained later to determine if any of the children nodes (Acc 1 to Acc 4) is an end point node of the network.

Any children nodes which are end point nodes do not form part of the fraudulent dispersal and no further tracing of transactions from that end-point node will be carried out.

On the other hand, for any of the first generation nodes which are not end point nodes, the transactions from each of the non-end point nodes are traced to a second generation of nodes (i.e. the children of those first generation nodes). These transactions may be time limited so that only transactions occurring within a period of time from the funds arriving in the account are traced. Examples of this time period include any period between 24 hours and 148 hours. As explained later, this period is statistically significant. The check of FIG. 4 is then applied to each of these second generation nodes to see which, if any, of these second generation nodes are also part of the fraudulent dispersal.

Figure 4:
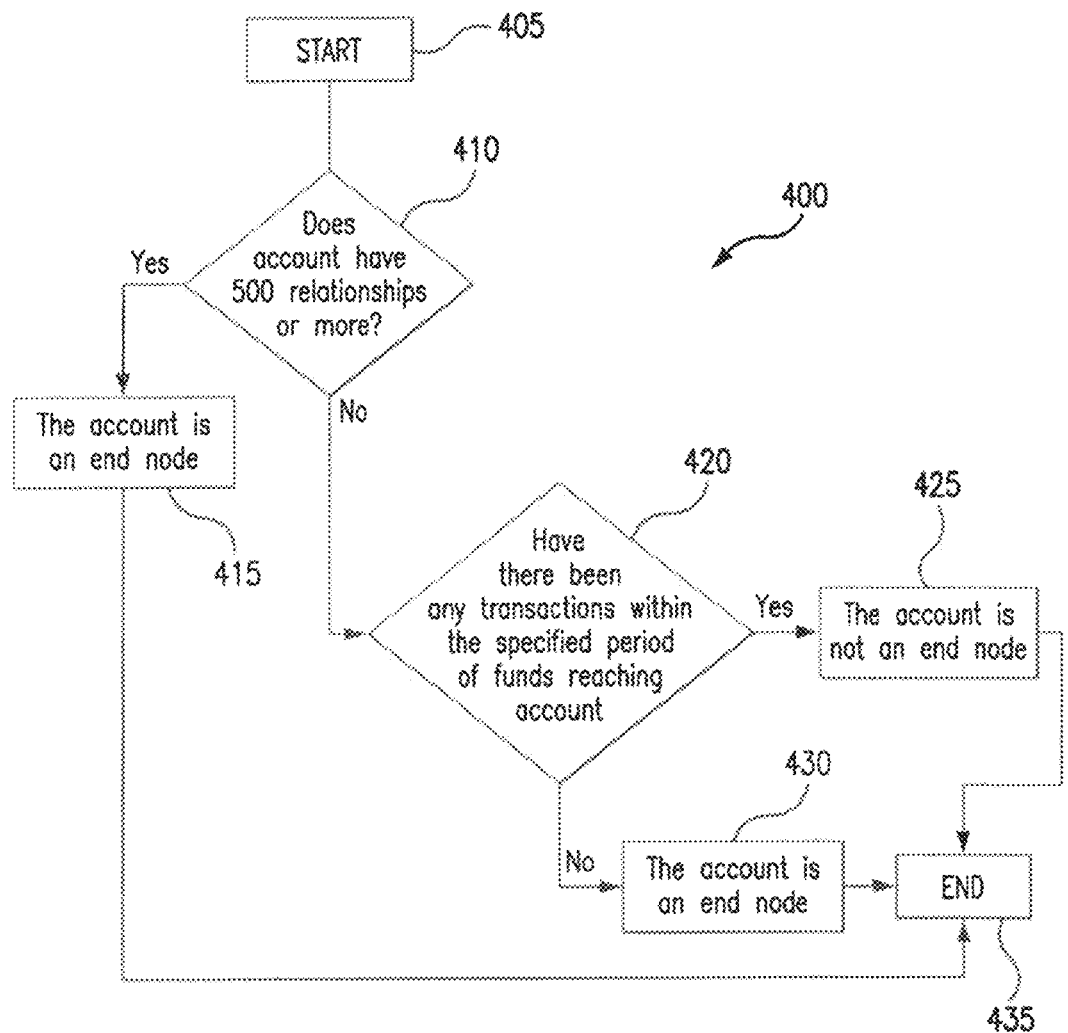
FIG. 4 shows a flow chart explaining the checking in a single account according to embodiments of the disclosure.

In FIG. 2B, therefore, as all of the first generation nodes (Acc 1 to Acc 4) are not end points, the check of FIG. 4 is applied to each of the second generation nodes. In other words, the check of FIG. 4 is applied to each of Acc 5, Acc 6, Acc 7, Acc 8, Acc 9 and Acc 10.

Turning to FIG. 4, embodiments of the disclosure are disclosed in the flow chart 400 which is a check applied to each node. This process is implemented, in embodiments, as computer readable code stored on storage medium 125. The process is carried out on processor circuitry 110.

The process starts at step 405. The process moves to step 410 where a first check is performed to determine whether the account under test (the node) has a predetermined number of account relationships. In some embodiments, the predetermined number is 500 or more account relationships. In this instance, an account relationship is set up between two accounts when a payer transfers money to a payee for the first time within the period of time of data stored in the process. This is an advantageous check because most large organizations, such as utility companies or local authority institutions (which are legitimate and so will not transfer fraudulent funds out of the account) have 500 or more account relationships. Of course, although in embodiments, 500 or more account relationships is chosen as the predetermined number, the disclosure is not so limited. The number may be less or more than this. However, it is noted here that the inventors have identified this number as being statistically significant.

Accordingly, in step 410, if the account has 500 or more account relationships, the yes path is followed to step 415 where it is determined that the account is an end node. The checking process then ends at step 435.

Alternatively, if the account has less than 500 account relationships, the no path is followed to step 420.

By performing this check, therefore, it is possible to quickly eliminate large organizations (which will not propagate the fraudulent money) from the remainder of check process. This reduces computational burden on the apparatus of FIG. 1 and accelerates the checking of the node.

Returning to step 420 of FIG. 4, a second decision is made. Specifically, it is determined whether there have been any transactions out of the account within a specified period of the incoming transaction to the node. For example, not only may a transaction in this instance include transferring money to another bank account, but a transaction may include a withdrawal of cash from an ATM, or a debit card purchase or the like.

In embodiments, the specified period is between 24 and 148 hours. This period is statistically significant because this identifies the typically rapid diffusion of fraudulent transactions whilst ignoring the natural flow of non-fraudulent transactions such as utility bill payments or the like. Of course other periods of time are envisaged such as 12 hours as well as various periods within this advantageous range of 24 to 148 hours.

In the event that there have been outgoing transactions from the account within the specified period of time, the yes path is followed to step 425 and the account is determined to not be an end-point node. Alternatively, if there has not been outgoing transactions from the account within the period of time, the no path is followed to step 430 and the account is determined to be an end-point node.

After step 425 or 430 has concluded, the flow chart moves to step 435 where the process ends.

It should be noted here that although the foregoing describes the check includes identifying the number of account relationships followed by determining that other outgoing transactions took place a predetermined time after the inbound transaction, the disclosure is not so limited.

Specifically, each of these checks may be performed on their own to assist in tracing the fraudulent accounts. This would still achieve the effect of quickly identifying the fraudulent accounts very quickly.

Alternatively, or additionally, the ordering of the two-step check of FIG. 4 may be performed in any order.

The checking process of embodiments described in FIG. 4 is particularly advantageous in the field of fraud detection because the account(s) used in fraudulent transactions can be traced quickly. This allows financial institutions to be notified of accounts which are used in fraudulent and scamming activity so that money can be stopped leaving those accounts and ultimately those accounts can be closed.

In addition, the checking process of embodiments of FIG. 4 identifies large organizations which are not used to propagate fraudulent funds. By quickly identifying these organizations and determining that these are the end node, they are quickly removed from the tracing path. This reduces the number of nodes to be traced which reduces the time and computational resource required in tracing the money.

Once the accounts have been identified, this information is passed to the banks involved. It is important to pass this information to the banks quickly. This is because, as noted above, the banks will only ever see money being transferred into an account and money being transferred from an account. The link to fraudulent activity would only ever be identified to the bank much later on (if ever) using known techniques. However, by using embodiments of the disclosure, fraudulent activity is identified to the bank much more quickly. This information will be provided to the bank using the network connection 115.

Building a Set of Traceable Messages Through a Network in Real Time:

As noted above, it is desirable to trace the dispersion of funds through a network as quickly as possible. This enables rapid identification of transactions and accounts which are associated with fraudulent activity. Accordingly, a method of building a set of traceable messages through a network of nodes according to the present embodiment which may be applied to the dispersion of funds through a network of financial institutions by transactions between bank accounts associated with those financial institutions is provided.

According to this present embodiment, the dispersion of funds through the network is determined more quickly and is substantially in real time, enabling rapid identification of transactions and accounts related to a transaction or account which has been reported as being linked with fraudulent activity.

Figure 5A:
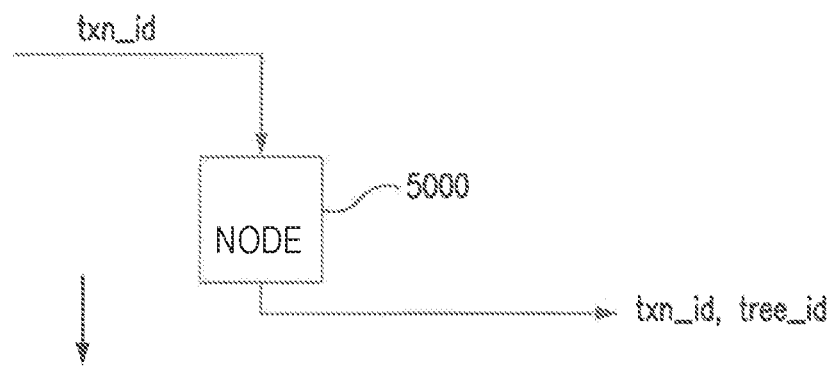
FIG. 5A illustrates an example of building a set of traceable messages according to an embodiment of the disclosure.

FIG. 5A illustrates an example of building a set of traceable messages according to this embodiment of the disclosure. In this embodiment, since the messages sent through the network relate to transactions between bank accounts the information contained in these transactions is standardized. As such, each message, or transaction, comprises a source identifier (identifying the account from which the message is sent), a destination identifier (identifying the account to which the transaction is sent). The transaction information also comprises a value in seconds indicating the time of the transaction and a unique identifier of the transaction such as a transaction identifier.

In the example depicted in FIG. 5A, the transactions between bank accounts can be considered as a stream consisting of a sequence of transactions between bank accounts. In an economy such as the UK, the number of transactions between accounts could reach a rate of around 300 transactions per second. The method according to the present embodiment converts the stream of transactions between accounts into a set of connected transactions, tracing the transfer of funds through the network. When a transaction from the stream of transactions is received, the method according to the present embodiment comprises determining a set of previous transactions through the network with which the received transaction is associated. The set of previous transactions may be referred to as a dispersion tree, as is explained in more detail below. In other words, for each transaction which is received (identified in this example by a unique identifier txn_id), an outbound message is produced which describes the set of previous messages or transactions the received transaction belongs to or is a member of.

Figure 5B:
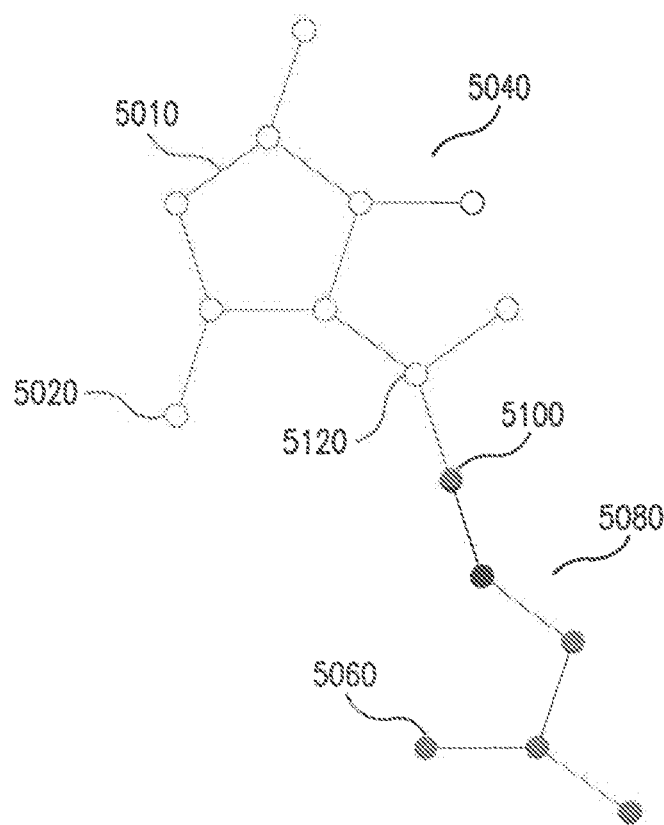
FIG. 5B depicts the connections between a set of bank accounts according to the an embodiment of the disclosure.

FIG. 5B depicts the connections between a set of bank accounts according to the present embodiment. In contrast to the FIGS. 2A and 2B, the source bank account 5020 does not necessarily relate to a bank account which has been reported as fraudulent, nor do the transactions 5010 between the accounts correspond to fraudulent transactions between these accounts. Rather, a set of connected transactions of funds through the network form a separate set of transactions within the network. That is, in the example shown in FIG. 5B, the set of transactions between accounts originating with account 5020 (indicated with the empty circles) form a first set of connected transactions 5040. In contrast, the set of transactions starting with a transaction from account 5060 form a second set of connected transactions 5080 (indicated by the filed circles). The transaction between accounts 5100 and 5120 may therefore belong to both set of connected transactions 5040 and set of connected transactions 5080 since accounts 5100 and 5120 are linked with both sets of transactions.

As described with reference to FIG. 5A, the stream of transactions is processed as each transaction is received. Accordingly, the transactions are identified and the set of traceable transactions are produced quickly and substantially in real time.

When an account, or transaction, is reported as being linked with fraudulent activity, the method according to the present embodiment enables all those accounts and transactions associated with the fraudulent activity to be rapidly identified. This enables financial institutions be notified very quickly of other accounts and transactions which are associated with fraudulent and scamming activity, such that money can be stopped leaving those accounts and ultimately those accounts can be closed.

Figure 6:
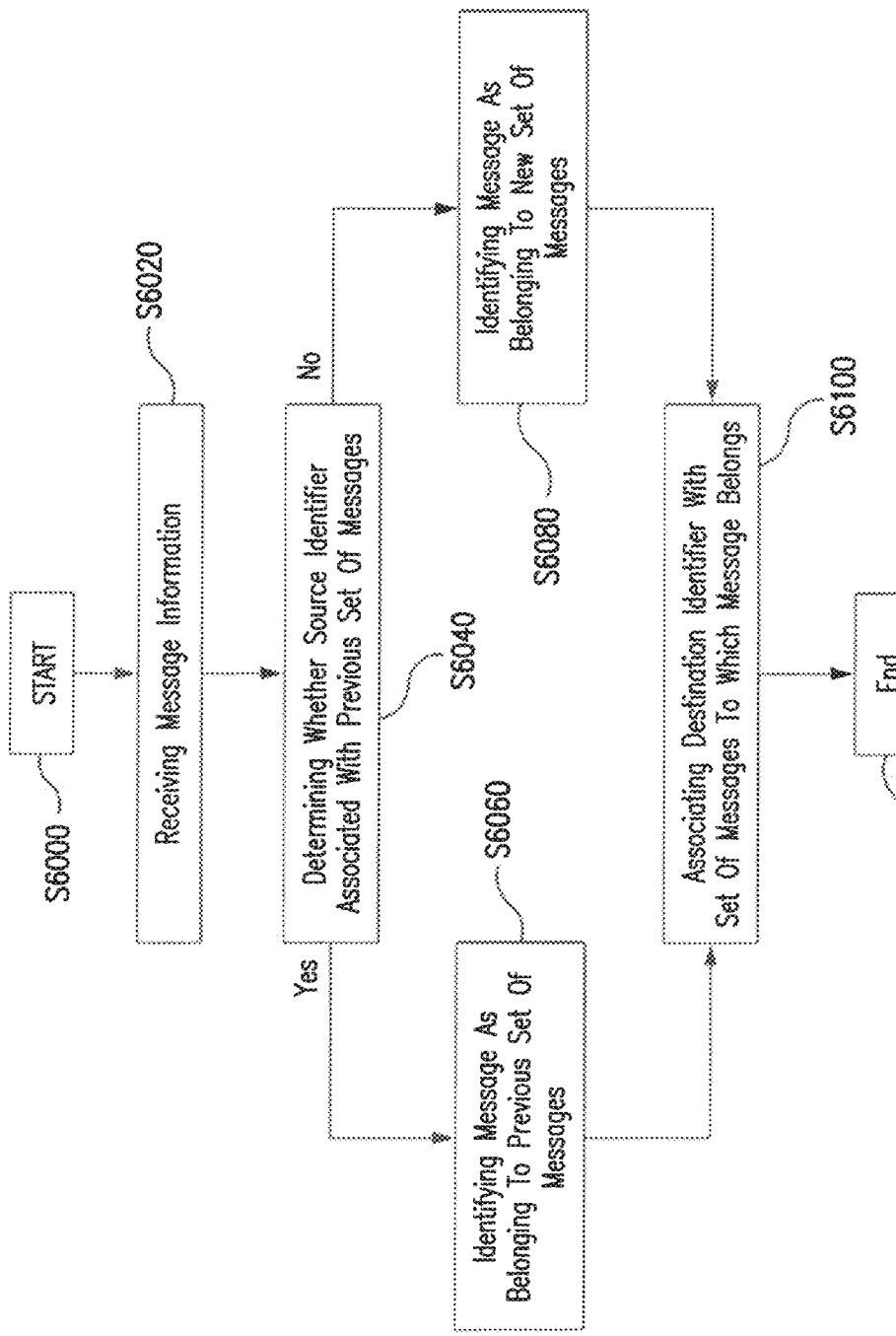
FIG. 6 illustrates a method of building a set of traceable messages through a network of nodes according to an embodiment of the disclosure.

Building a Set of Traceable Messages:

FIG. 6 illustrates a method of building a set of traceable messages through a network of nodes according to the present embodiment of the disclosure. Step S6020 comprises receiving message information corresponding to a first message, the message information comprising a first source identifier and a first destination identifier. Step S6040 comprises determining whether the source identifier is associated with a previous set of messages. When the first source identifier is associated with a set of previous messages, the method comprises identifying the first message as also belonging to the set of previous messages in step S6060. When the first source identifier is not associated with a set of previous messages, the method comprises identifying the first message as belonging to a new set of messages in step S6080. Then, in step S6100, the method comprises associating the first destination identifier with the set of messages to which the first message belongs, such that if a second message is sent from that destination, the second message will be identified as belonging to that set of messages.

The method steps S6020 to S6100 are described in detail below, with reference to the example illustrated in FIGS. 5A and 5B.

As described above, in the example depicted in FIG. 5A, the messages referred to in FIG. 6 may relate to transactions between a network of bank accounts, and as such, a set of previous messages corresponds to a set of connected transactions tracking the dispersion of a set of funds through the accounts of the network.

In this example, each bank account within the network is therefore a node of the network. The transaction transferring the money is therefore an edge of the network. This means that the skilled person in the art may consider the network as a graph and, therefore, may implement graph theory in analyzing the network. Accordingly, a set of previous messages or transactions represents a tree, and may be referred to as a dispersion tree.

As previously stated, in this example, the stream of transactions is consumed transaction by transaction substantially in real time. For each transaction that is received, a single outbound message is produced which describes which dispersion tree, or set of previous messages or transactions, the received transaction belongs to or is a member of. In order to identify the dispersion tree to which an inbound transaction belongs, the method according to the present embodiment produces and maintains a set of leaves, or end points of the dispersion trees, in a storage unit A:

A: account_id→tree_id where account_id is a unique identifier which identifies the bank accounts which are part of the banking network, and tree_id is an identifier which identifies the dispersion trees as described above. After receiving transaction information in step S6020, the account_id of the bank account from which the transaction is sent, the source identifier, is checked for presence in the storage unit A in step S6040. This could be, for example, through a lookup of the source identifier in the storage unit A. It will be appreciated that the function used to perform this lookup is not particularly limited in this regard. It will further be appreciated that the account identifier according to the present example may relate to any unique identifier or combination of identifiers which identify the account to which they belong, and is not particularly limited in this regard. The method then proceeds to step S6060 or step S6080 according to the result of this determination.

When it is found that the source identifier is associated with a dispersion tree in the storage unit A, then, in step S6060, the dispersion tree with which that source identifier is associated in the storage unit A will be retrieved, and the transaction will be identified as also belonging to that dispersion tree. That is, according to the present example, the single outbound message describing which dispersion tree the received transaction belongs to may be produced at this stage.

However, when it is determined that the source identifier is not associated with a dispersion tree in the storage unit A, then, in step S6080, the method comprises identifying the first message as belonging to a new set of messages. That is, since the received transaction originated from an account which is not stored in the storage unit A, and thus is not associated with any previous dispersion trees, then it is determined that the transaction represents the start of a new dispersion of funds through the banking network. Therefore, a new dispersion tree is created, having a new dispersion tree identifier (tree_id), and the received transaction is identified as belonging to this new dispersion tree. That is, according to the present example, the single outbound message describing which dispersion tree the received transaction belongs to may be produced at this stage.

The new tree_id may be generated in accordance with transaction information corresponding to the received transaction. For example, the new tree_id may be generated based upon a unique transaction identifier identifying the received transaction or the like.

Once the received transaction has been identified as belonging either to a previous dispersion tree or a new dispersion tree as described above, the method proceeds to step S6100.

In step S6100, the account_id of the bank account to which the transaction is sent, the destination identifier, is then added to the storage unit A, being mapped against the dispersion tree to which the transaction has been identified as belonging. That is, if the transaction has been identified as belonging to a previous dispersion tree then the destination identifier be mapped against the previous dispersion tree, whereas if the transaction has been identified as belonging to a new dispersion tree the destination identifier will be mapped against the new dispersion tree.

Accordingly, if a further transaction is sent from the account having the account_id corresponding to the destination identifier of the first transaction, then the second message will also be identified as belonging to that dispersion tree.

As will be appreciated from the above described example, the method of building a set of traceable messages through a network of nodes according to the present embodiment therefore requires only a single lookup in the storage A for each transaction which is received. That is, regardless of the size of the stream of transactions, each individual transaction triggers only a single lookup of the source identifier in the storage unit A in order to retrieve any dispersion tree identifiers with which the source identifier is associated. This enables the identification of a dispersion tree to which a transaction belongs to be performed quickly and substantially in real time as the stream of transactions is consumed. As such, if a transaction is subsequently reported as a transaction of interest, being linked to fraudulent activity for example, then accounts or transactions which are associated with that reported transaction can quickly be identified, since the dispersion tree has already been created as the stream of transactions is consumed; thus increasing the speed at which related fraudulent activity is recognized and reducing the computational burden upon the network.

The method according to the present embodiment may be performed on an apparatus (or alternatively a server) as described with reference to FIG. 1. As previously stated, this apparatus 100 is controlled using a microprocessor or other processing circuitry 110. The apparatus is connected to the network and is able to receive transaction information from each node of the network. For each transaction of the stream of transactions the apparatus 100 performs the method steps S6020 to S6100 according to the present embodiment in order that the identification of the dispersion tree to which the transaction belongs can be performed quickly and substantially in real time.

Figure 7:
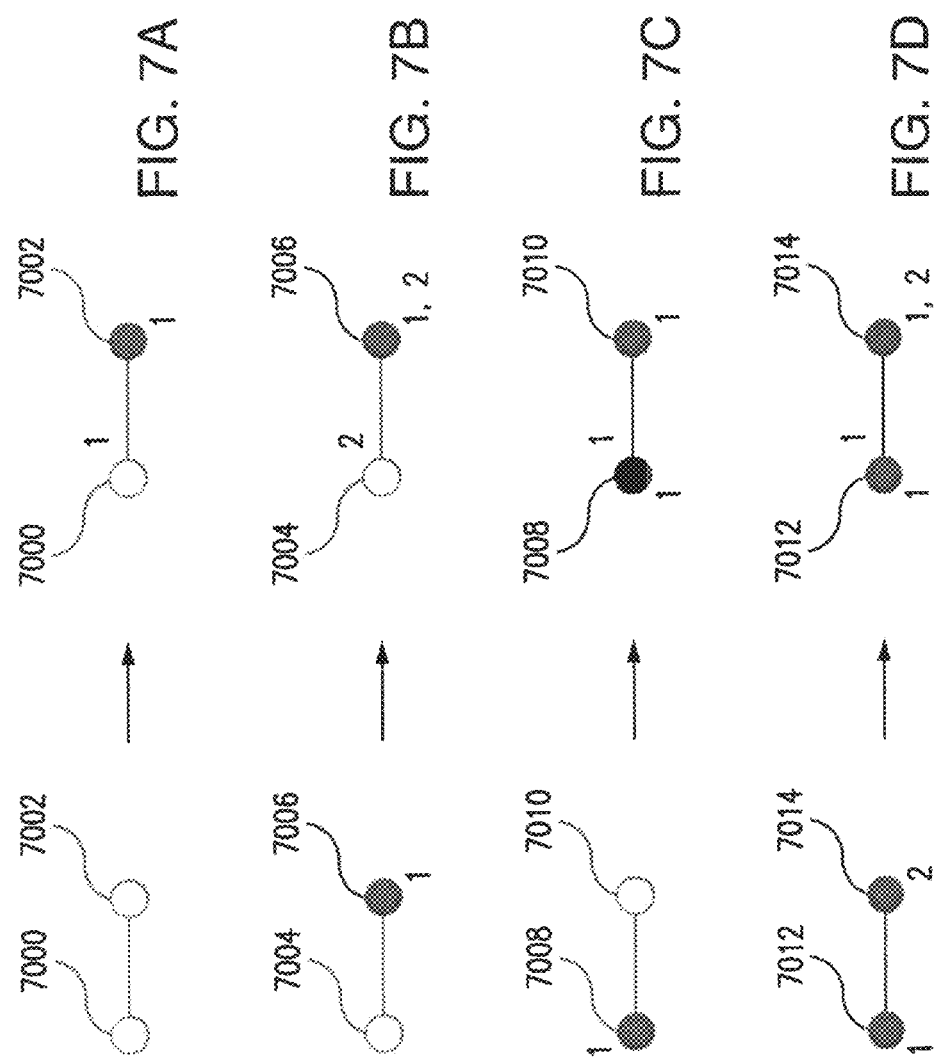

Exemplary Messages and Transactions:

FIG. 7 illustrates a set of exemplary messages according to this embodiment of the disclosure. As depicted in FIG. 7, when considering a transaction between two accounts, there are four distinct possibilities: A) neither source account or the destination account belongs to a previous dispersion tree; B) the source account belongs to a previous dispersion tree, but the destination account does not belong to a previous dispersion tree; C) the source account does not belong to a previous dispersion tree but the destination account belongs to a previous dispersion tree and D) both the source account and the destination account belongs to a previous dispersion tree. In FIG. 7, an account associated with a previous dispersion tree is illustrated with a filed circle, while an account which is not associated with a previous dispersion tree is illustrated by an empty circle. Each of these situations will be considered with reference to the method described in FIG. 7.

Consider now the first situation A), where neither the source account 7000 nor the destination account 7002 belongs to a dispersion tree. The transaction information comprising the source identifier 7000 and the destination identifier 7004 is received in step S6020 of FIG. 6. The method according to the present embodiment then comprises determining whether the source identifier (identifying the account from which the transaction is sent) belongs to a previous set of messages or not. In this example, as stated above, the source identifier does not belong to a dispersion tree; that is, the source identifier is not associated with a dispersion tree in a storage device A storing a mapping of account identifiers to dispersion trees. Accordingly, the method proceeds to step S6080. In step S6080, since the source identifier is not associated with a previous dispersion tree, it is determined that the transaction represents the start of a new dispersion of funds (linked transactions) throughout the network. Accordingly, a new dispersion tree is generated. In this example, the generation of a new dispersion is achieved by generating a new dispersion tree identifier with which the subsequent transactions belonging to that dispersion tree will be associated. As depicted in FIG. 7, the transaction is identified as belonging to a new dispersion tree with identifier 1.

Furthermore, in this example, the destination account 7002 will then be associated with the dispersion tree to which the transaction between accounts 7000 and 7002 belongs. That is, an association between the destination identifier and the dispersion tree identifier generated in step S6080 will be stored in the storage unit A, such that if further transactions are sent from that account, those transactions will also be identified as belonging to the same dispersion tree as account 7002.

Consider now the example B) of FIG. 7, where the source account 7004 does not belong to a known dispersion tree, but the destination account 7006 does belong to a known dispersion tree. In this example, the transaction information comprising the source identifier and the destination identifier is received in step S6020. In this exemplary situation, as described with reference to the first situation A) above, the source identifier identifying the source account 7004 is not associated with a previous set of transactions. Therefore, again as described with reference to the first situation A) in FIG. 7, the method comprises identifying that the transaction represents the start of a new dispersion tree, or set of transactions, of funds through the network of accounts in step S6080. The new dispersion tree is identified by the identifier 2 in this example.

In this example however, the destination account 7006 already belongs to a previous dispersion tree (illustrated as dispersion tree 1). Since the transaction has been identified as belonging to dispersion tree 2, the destination account 7006 therefore forms a part of both the previous dispersion tree 1 and the new dispersion tree 2 generated in step S6080. Accordingly, the destination account 7006 is then associated with the dispersion tree 2 in step S6100. However, this does not remove the association between the destination account and the previous dispersion tree 1. Rather, the destination account 7006 is then associated with a plurality of dispersion trees. As such, in this example, if a further transaction is generated from the account 7006 then that transaction will be associated with both the dispersion trees 1 and 2. According to the present embodiment, in the case that a certain condition is satisfied, two separate dispersion trees may be combined into a single resultant dispersion tree. That is, for example, if a certain number of the transactions associated with a first dispersion tree overlap with a second dispersion tree, those dispersions trees could be combined such that the related transactions are identified as belonging to a single resultant dispersion tree.

Consider now the third example C) in FIG. 7, representing a transaction between a source account 7008 which belongs to a previous dispersion tree 1, and a destination account 7010 which does not belong to any previous dispersion tree. In this example, transaction information comprising the source identifier and the destination identifier is received in step S6020 of FIG. 6. In step S6040 it is determined that the source identifier identifying the source account 7008 is associated with a previous dispersion tree. In this example, and in contrast to situations A) and B) described above, the method proceeds to step S6060 of FIG. 6. In step S6060, the transaction between the source account and the destination account is identified as also belonging to the dispersion tree 1 (because it originated from an account which belonged to a previous dispersion tree). That is, the dispersion of funds from account 7008 is thus linked to the previous set of transactions transferring those funds through the network. The method then proceeds to step S6100 of FIG. 6.

In step S6100 of FIG. 6, it is determined that the destination account 7010 should also be associated with the dispersion tree 1 to which the transaction between the accounts 7008 and 7010 has been identified as belonging. That is, in this example, the destination account 7010 is identified as also belonging to dispersion tree 1, such that any further transactions originating from this account will also be identified as belonging to dispersion tree 1.

Finally, consider the situation D) of FIG. 7, whereby the source account 7012 and the destination account 2014 belong to a previous dispersion tree. As illustrated in FIG. 7, the source account 7012 is associated with a previous dispersion tree 1, while the destination account 7014 is associated with a previous dispersion tree 2. In this example, the transaction information comprising the source identifier and the first destination identifier is received in step S6020 of FIG. 6. In this example, the source identifier is determined as being associated with a previous dispersion tree in step S6040. As such, the method comprises, in step S6060, associating the transaction between accounts 7012 and 7014 as belonging to that dispersion tree 1 also. The method then proceeds to step S6120 of FIG. 6.

In step S6120, the destination account 7014 is further associated with the dispersion tree 1 to which the transaction has been identified as belonging to, such that if further transactions are sent from account 7014, they will also be identified as belonging to that dispersion tree 1. If the destination account 7014 belongs to a dispersion tree which is the same as the dispersion tree to which the transaction has been identified as belonging to, then, according to the present example, this association will merely be updated in the storage unit A. However, if the destination identifier already belongs to a dispersion tree, but that dispersion tree is distinct from that which the transaction has been identified as belonging to, then the destination account 7014 will be associated with a further dispersion tree. As described above, according to the present example, this does not remove the association between the destination account 7014 and dispersion tree 2. Rather, the destination account is identified as belonging to two dispersion trees (1 and 2) such that if further transactions are sent from that account, they will be identified as belonging to both dispersion tree 1 and 2.

In summary, according to the present embodiment, the dispersion tree to which the transaction is associated is determined in accordance with the account from which the transaction originates. Furthermore, the destination account associated with that transaction is subsequently associated with that dispersion tree, such that when further transactions are sent from that account they are also identified as belonging to that dispersion tree. By consuming the stream of transactions in this manner, using the method described with reference to FIG. 6, a set of dispersion trees tracing the dispersion of funds through the network is produced quickly and substantially in real time.

Application of a Timer:

According to the above described method, once an account has been identified as belonging to a given dispersion tree, any further transaction from that account will be identified as also belonging to that dispersion tree. As such, a transaction from that account which occurs even after an extended period of time, such as several weeks or months after, will be associated as belonging to that dispersion tree. However, in the example relating to the dispersion of funds through a banking network, as described above, typically, the fraudster will utilize a transaction which allows money to be transferred between various bank accounts very quickly such as within a matter of seconds or minutes. Therefore, in this situation, transactions which occur after a predetermined time has expired are not likely connected to the same dispersal of fraudulent funds through a network.

FIG. 8 illustrates a method of building a set of traceable messages through a network of nodes according to this embodiment of the disclosure. Steps S8000 to S8100 are the same as steps S6000 to S6100 described above with reference to FIG. 6. As such, for brevity, these steps will not be described in detail again at this stage. Once the destination identifier has been associated with the set of previous messages to which the received message belongs in step S8100, the method proceeds to step S8120.

Step S8120 comprises setting a first timer which will remove the association between the first destination identifier and the set of messages to which the first message belongs after a predetermined time.

Consider, for example, the first situation A) as depicted in FIG. 7 where neither the source account 7000 nor the destination account 7002 belongs to a dispersion tree. In this situation, when the destination account 7002 is associated with the new dispersion tree 1 to which the transaction between the source account 7000 and the destination account 7002 has been identified as belonging to, a timer will also be set. As such, when the timer expires, according to the present embodiment, the association between the destination account 7002 and the dispersion tree 1 will be removed. Therefore, if further transactions are sent from the account 7002 after the timer has expired those transactions will not be identified as belonging to dispersion tree 1.

It is worth noting that while the association between the account and the dispersion tree is removed after the timer has expired, such that further transactions from that account will not be associated with that dispersion tree, the transactions which have already been identified as belonging to that dispersion tree will remain as identified as belonging to that dispersion tree. Accordingly, in the event of a fraudulent account or transaction being reported, it is still possible to identify the transactions connected with the reported fraud through the dispersion tree with which they are identified even after the timer has expired.

Furthermore, each account associated with a given dispersion tree will have its own timer. It is therefore necessary for the timer of every account associated with that dispersion tree to expire in order to determine that no further transactions may be identified as belonging to given dispersion tree.

In certain examples, the timer which will remove the association between the account and the dispersion tree may be set to any value in period is between 24 and 148 hours. This period is statistically significant because this identifies the typically rapid diffusion of fraudulent transactions whilst ignoring the natural flow of non-fraudulent transactions such as utility bill payments or the like. Of course other periods of time are envisaged such as 12 hours as well as various periods within this advantageous range of 24 to 148 hours for example.

Using a timer to remove the association between the account and dispersion tree according to the present embodiment further improves the ability to track transactions (which may be fraudulent) through a network quickly and substantially in real time, since only transactions which occur within a statistically significant period will be identified as belonging to the same dispersion tree. A new distinct dispersion tree will be created if a further transaction occurs from the account after this period of time has expired.

The method according to the present embodiment may also comprise resetting the timer for a given account under certain situations. Accordingly, FIG. 9 illustrates a method of building a set of traceable messages through a network of nodes according to the present embodiment of the disclosure. Step S9000 is the same as steps S61000 and S81000 described with reference to FIGS. 6 and 8 above. It will be appreciated that Steps S6000 to S6080 have already been performed prior to the start of the method shown in FIG. 9 in step S9000.

In step S9000, as described above with reference to FIGS. 6 and 8, the method comprises associating the destination identifier with the set of messages to which the received message belongs, such that further messages sent from that account will also be identified as belonging to that set of messages. The method then proceeds to step S9020.

In step S9020 the method comprises determining whether a timer corresponding to the association between the destination identifier and the previous set of messages exists and has not expired. When a timer exists and the message has been received before the predetermined time has expired, the method proceeds to step S9040 which comprises resetting the first timer which will remove the association between the first destination identifier and the set of messages to which the first message belongs after a predetermined time. In contrast, when the timer exists and the third message is received after the predetermined time has expired, or when a timer does not exist at all, the method comprises proceeds to step S9060 which comprises associating the destination identifier with the set of messages to which the message belongs, such that if a second message is sent from that destination, the second message will be identified as belonging to that set of messages and setting a first timer which will remove the association between the first destination identifier and the set of messages to which the first message belongs after a predetermined time.

For example, consider the fourth exemplary situation D) in FIG. 7, whereby the source account 7012 and the destination account 7014 belong to previous dispersion trees 1 and 2. In this case, the transaction is identified as belonging to dispersion tree 1, because the source account 7012 belongs to that dispersion tree. As described above if the destination identifier already belongs to a dispersion tree, but that dispersion tree is distinct from the dispersion tree which the transaction has been identified as belonging to, then the destination account 7014 will be associated with a further dispersion tree and a timer will be set to remove that association after the predetermined time has expired. However, according to the present example, if the destination account 7014 has already been identified as belonging to that dispersion tree 1, and the timer corresponding to that dispersion tree has not expired, then the timer corresponding to that dispersion tree will be reset. Accordingly, further transactions from that account which occur within the predetermined time will continue to be associated with that dispersion tree.

In this manner, the method according to the present embodiment converts the stream of transactions between accounts into a set of dispersion trees tracing the transactions between accounts, while maintaining an active set of end-points, or leaves, of the transactions. If further transactions associated with that dispersion tree do not place further funds into an account associated with that dispersion tree within the predetermined time then that account will be removed from the set of active leaves of the dispersion tree. Accordingly, it is possible to ensure that transactions which are not temporally connected within the predetermined time as defined above will not form part of the same dispersion tree, thereby improving the ability and speed of tracing the dispersion of transactions through a network.

Storage of the Transaction Identification:

Returning now to the example of the stream of transactions which are received in the UK banking network, as described with reference to FIGS. 5A and 5B above. The stream of transactions is consumed transaction by transaction, as described above, quickly and substantially in real time. That is, when a transaction is received, the dispersion tree to which the transaction belongs is identified through the method described with reference to the method described in FIG. 6, FIG. 8 and FIG. 9 above. That is, when the transaction is identified as belonging to a particular dispersion tree (either a previous dispersion tree or a new dispersion tree) a single outbound message is produced describing to which dispersion tree, or set of previous messages or transactions, the received transaction belongs or is a member of.

FIG. 10 illustrates a method of storing and retrieving transaction identification according to the present embodiment. Steps S1000 to S1008 describe the method of storing the mapping between the transaction and the dispersion tree in storage units B 1002 and C 1000 as described above. In contrast, method steps S101 to S1018 describe the method of retrieving the mapping between the transaction and the dispersion tree from the storage units B 1002 and C 1000 in response to receiving a transaction request such as a request to identify all transactions linked with a fraudulent transaction.

The method of storing the mapping between a transaction and a dispersion tree upon identification that the transaction belongs to the dispersion tree according to the present embodiment will first be described with reference to steps S1000 to S1008 of FIG. 10.

When a message, or in this example a transaction, is identified S1002 as belonging to a previous set of transactions (or dispersion tree), a mapping between the transaction and the corresponding dispersion tree is created and stored in the storage unit B (step S1004):

B: txn_id→tree_id where txn_id is a unique identifier of the transaction and tree_id is a unique identifier of a dispersion tree, or set of previous transactions, to which the transaction belongs. Every new transaction which is received in the stream of transactions is added to the mapping stored in B in this manner. It will be appreciated that, in accordance with the exemplary situations described with reference to FIG. 7 above, the transaction may be mapped to a plurality of tree_id where the transaction is identified as belonging to a plurality of dispersion trees.

As the stream of transactions is consumed and a transaction is identified as belonging to a given dispersion tree, for example when the mapping between the txn_id and the tree_id is added to B, a corresponding mapping is also created which stores every dispersion tree against all the transactions which are associated with that transaction in a storage unit C (step S1006):

C: tree_id→[txn_id, txn_id . . . txn_id]

Accordingly, the storage C maintains a list of all the transactions which are associated with a given dispersion tree, while the storage B maintains a list of all the dispersion trees which are associated with a given transaction. Where, as described above, the transaction is identified as belonging to a number of dispersion trees, and then the txn_id corresponding to that transaction will be added to the mapping stored in C separately for each dispersion tree with which the transaction has been identified.

In this manner as the stream of transactions is received and processed according to the present embodiment, and each transaction is identified as belonging to a given dispersion tree as described above, a storage of the mapping between the transaction and associated dispersion tree can also be created quickly and substantially in real time.

Extraction of Transaction Identification:

The method of retrieving or extracting the mapping between a transaction and a dispersion tree according to the present embodiment will now be described with reference to method steps S1010 to S1018 of FIG. 10.

In step S1012 a transaction request is received. That is, a unique identifier identifying a transaction of interest is received. According to some exemplary situations, this could be in response to the transaction as being reported with fraudulent activity. When the unique identifier of the transaction is received, the method proceeds to step S1014.

In step S1014, the method comprises determining a set of transactions associated with the received transaction request. That is, the method comprises extracting from the storage unit B the tree_id which is associated with the given transaction identified by txn_id. If the transaction is associated with a number of dispersion trees, then the tree_id corresponding to each of those distinct dispersion trees will be extracted from the storage unit.

Once the tree_id has been extracted in step S1014, the method proceeds to step S1016. In step S1016, the method comprises retrieving the list of transactions which are associated with the set of transactions in the storage unit C. That is, the method comprises extracting from the storage unit C the txn_id of every transaction which is associated with the corresponding tree_id. If a plurality of tree_id are extracted from the storage unit in S1014, then the txn_id of every transaction which is associated with the corresponding tree_id will be retrieved in turn. These transactions may then be reported back in response to the received transaction request.

Therefore it will be appreciated that, according to the present embodiment, a single lookup is required in B for a transaction which has been reported as fraudulent, and a single lookup in C is required for each dispersion tree with which the fraudulent transaction is associated in order to determine those transactions that are linked with the reported fraudulent transaction. The time required for fraudulent transactions which are linked with the reported fraudulent activity to be identified according to the present embodiment is further reduced. This therefore increases the speed of the network at identifying fraudulent transactions which are linked with reported fraudulent activity.

Exemplary Identification of Transactions Associated with a Fraudulent Transaction:

In the case that a message has been determined as a message of interest it is required that rapid identification of the messages which are associated with that message can be rapidly obtained. For example, in the case of a banking network, if a transaction has been reported as fraudulent, or has been linked to a fraudulent account, then it is necessary to rapidly identify other transactions which are associated with that banking transaction or account. This is important because once accounts linked with the fraudulent activity have been identified those accounts can be closed to frustrate the fraudster from performing similar fraudulent transactions. It will be appreciated that the manner of detecting the initial fraudulent activity according to the present embodiment is not particularly limited.

FIG. 11 illustrates a series of transactions between bank accounts which have been processed into a set of dispersion trees according to the present embodiment. Here, as with reference to FIG. 5B above, the bank accounts may all be associated with a single financial institution, or may instead be associated with a plurality of financial institutions. It will be appreciated that the stream of transactions has been consumed substantially in real time, and according to this example, a mapping between the transactions and dispersion trees have been stored in storage units B and C as described above.

In this example, at a time t seconds after the stream of transactions has been consumed, the transaction between bank account 1102 and bank account 1104 is reported as being linked to fraudulent activity. At this time, it is necessary to rapidly identify the dispersal of the funds from the fraudulent activity through the banking network. Upon receiving a unique identifier of the transaction between bank accounts 1102 and 1104, which has been reported as fraudulent, the method according to the present embodiment comprises performing a single lookup for that transaction in the storage unit B. That is, a single lookup is performed in B which returns the tree_id of the dispersion tree, or dispersion trees, with which the transaction has been associated.

Once the tree_id with which the fraudulent transaction is associated has been retrieved from the mapping stored in B, the method according to the present embodiment comprises performing a second lookup in the storage unit C. That is, a further lookup is performed in the mapping stored in C which returns a list of all the transactions which belong to the tree_id which has been retrieved from B.

Therefore, in the example illustrated in FIG. 11, once the transaction between bank accounts 1102 and 1104 has been reported as being a transaction associated with fraudulent activity, those transactions which are associated with that transaction (by virtue of belonging to the same dispersion tree) can rapidly be identified. In this example, the transaction belonging to the same dispersion tree as the transaction between accounts 1102 and 1104 are indicated by the filled circles.

While the above method of identifying transactions has been described in relation to a reported fraudulent transaction, it will be appreciated that the lookup in B could also be initiated through a reported fraudulent account or the like, and is not particularly limited in this regard.

The speed at which fraudulent transactions that are linked with the reported fraudulent activity can be identified according to the present embodiment is further increased. That is, because the dispersion of funds through the network has been constructed quickly and substantially in real time using the method according to the present embodiment, when a transaction has been reported as fraudulent no further calculations are required in order to trace the dispersion of funds through the network; increasing the speed at which related fraudulent activity is recognized and reducing the computational burden upon the network Rather, according to the present embodiment, the connected transactions can simply be retrieved through a small number of lookups. Typically, owing to the limited number of lookups required in response to a fraudulent transaction being reported, the identification of the linked transactions can be performed in a matter of milliseconds. As such those accounts linked with the fraudulent transaction can be rapidly closed or deactivated in order to frustrate the fraudster from performing any further fraudulent transactions.

Additional Modifications of the Embodiment:

As described above, when an account associated with a dispersion tree, it may be advantageous to include a timer such that only transactions from that account which occur within a predetermine time of the given transaction are identified as belonging to the same dispersion tree. Typically, as described above, the timer may be set to any value in period is between 24 and 148 hours for example. This period is statistically significant because this identifies the typically rapid diffusion of fraudulent transactions whilst ignoring the natural flow of non-fraudulent transactions such as utility bill payments or the like. Once all the accounts associated with a given dispersion tree have been removed from the mapping in storage A, no further transactions in the stream of transactions can be identified as belonging to that dispersion tree.

Accordingly if, after a predetermined time, a dispersion tree is associated with only a single transaction, then it can be determined that no further transactions can be associated with that dispersion tree. For example, if after a predetermined time of a tree_id being added to the storage unit C that tree_id is mapped only to a single txn_id, then it can be determined that no further txn_id will be added to the mapping. It will be appreciated that the predetermined time can be set at any time, but should be set in accordance with the time set for the first timer associated with that dispersion tree described above.

Once it has been determined that no further transactions can be associated with that tree_id, and that tree_id is mapped to only a single txn_id in the storage unit, then the method according to the present embodiment may comprise removing from C the corresponding tree_id. Furthermore, at this time, the method comprises removing from B the corresponding single txn_id which was associated with that tree_id. The data stored in B and C is thus reduced.

Consider the case whereby a txn_id which has been removed from the mapping stored in B is subsequently reported as being linked to a fraudulent activity. According to the present embodiment, a single lookup will subsequently be performed in B in order to identify the dispersion tree with which that fraudulent transaction is identified; this dispersion tree would then be used in order to identify all the transactions which are associated through a lookup of that dispersion tree in the storage C. However, upon performing the initial lookup in B in response to the fraudulent activity being reported, no dispersion tree would be returned since the txn_id has been removed from the mapping stored in B. According to the present embodiment, it can then be determined that no further transactions occurred within the predetermined time of the fraudulent transaction or fraudulent activity. That is, it can be determined that no further fraudulent transactions are associated with that fraudulent transaction or fraudulent activity.

By removing the mapping between the from the txn_id and tree_id from the storage units B and C respectively, it is possible to significantly reduce the storage requirements necessary to perform the method of building a set of traceable messages through a network of nodes according to the present embodiment. Consider, for example, the stream of transactions between bank accounts in the UK. As previously stated, in an economy such as the UK, the number of transactions between accounts could reach a rate of around 300 transactions per second. Moreover, of these transactions, the vast number will be transactions of the kind above whereby, after a predetermined time, they are the only transaction associated with a given dispersion tree. As such, by removing these transactions and corresponding dispersion trees from the storage units B and C as according to the present embodiment, the storage requirements according to the present embodiment can be significantly reduced.

While the method according to the present embodiment has been described with reference to financial transactions between bank accounts in a banking network such as that described with reference to FIG. 5, it will be appreciated that present disclosure is not so limited in this respect. That is, the messages according to the present embodiment could relate to any type of financial transaction between bank accounts or financial institutions made by any method such as Faster Payments, BACS transfers or the like. Alternatively, the method according to the present embodiment could be used to construct a set of traceable messages with relation to any message or transaction, and is not so limited to financial transactions. For example, the method according to the present embodiment could be applied to building a set of traceable messages through a mobile communications network or the like.

Tracing Messages Through a Network of Nodes Using a Trace Request:

As noted above, it is desirable to trace the dispersion of funds through a network as quickly as possible. This enables rapid identification of transaction and accounts associated with fraudulent activity. Furthermore, it is desirable to provide an increased level of privacy and security, particularly with regards to the information relating to the dispersion of funds through the network. Accordingly a method for tracing a set of messages through a network of nodes is provided. The method of tracing messages through a network of nodes according to the present embodiment may be applied to the dispersion of funds through a network of financial institutions by transactions between bank accounts associated with those financial institutions. According to the present embodiment, the dispersion of funds through the network is determined quickly and substantially in real time, as the stream of transactions is received. Furthermore, according to this embodiment of the disclosure, the method of tracing messages can be applied by to a distributed system of nodes such that each the identification of the messages is performed locally at each node without the requirement for a central node or database thus reducing the integration costs and increasing network privacy and security.

FIG. 12 illustrates an exemplary application of the method of tracing messages through a network of nodes according to the present embodiment of the disclosure. In this example, the network of financial institutions 1202, 1206 and 1210 (or nodes) are provided in a distributed manner, without any central node or database. That is, each of the respective financial institutions is in communication with, and capable of sending and receiving transactions to and from, all the other financial institutions in the network. Furthermore, each of the financial institutions may have a plurality of bank accounts associated with it. As such, for example, a transaction may be sent from a bank account associated with financial institution 1204 to a bank account associated with financial institution 1208 or 1212 respectively. It will also be appreciated that a transaction may relate to a transaction between two bank accounts associated with the same financial institution.

Each of the financial institutions 1202, 1206 and 1210 illustrated in FIG. 12 may be located in the same geographical area, or may alternatively be located in different geographical areas having distinct legislative or regulatory restrictions. That is, while the financial institutions are in communication with each other, such that transactions may be exchanged between them, there is no restriction upon the geographical locations of those institutions. By means of an example, financial institution 1202 may be located within a geographical area such as the UK, while financial institution 1206 or 1210 may be located in a different geographical area such as the USA. By providing the method according to the present embodiment in this distributed manner, the respective data held and processed by each financial institution can be governed by the legislative or regulatory restrictions of the area in which the financial institution is located, without any requirement to transfer the data or information to a central node or database of an analytics provider.

That is there is no central node which performs the method of building a set of traceable messages as transactions are sent between the financial institutions. Rather, each financial institution is in communication with a local device belonging to that financial institution. That is, financial institution 1202 is in communication with device 1204, financial institution 1206 is in communication with device 1208 and financial institution 1210 is in communication with device 1212. The device may be integrated within the respective financial institution, or may be located outside the financial institution as illustrated within FIG. 12. It will be appreciated that this device may be a device such as the device or apparatus described with reference to FIG. 1.

All the transactions which a financial institution such as 1202 engages in are notified to the respective device 1204. That is, when the financial institution 1202 sends a transaction to financial institution 1206, the device 1204 will be notified of transaction information regarding the sent transaction. Conversely, when financial institution 1206 receives the transaction, the device 1208 will be notified of transaction information regarding the received transaction. However, financial institution 1210 and corresponding device 1212 will not receive any notification of this transaction or transaction information at this stage. Accordingly, the devices 1204, 1208 and 1212 receive transaction information relating to each transaction in which the corresponding financial institution participates.

As previously stated, in an economy such as the UK, the number of transactions between accounts could reach a rate of around 300 transactions per second. Accordingly, when a transaction is identified as belonging to fraudulent activity it becomes difficult to identify other transactions with which that transaction is associated. This is, in part, because banks will typically only see money entering one account and leaving the same account a short time later; there is no indication to the bank that these transactions are linked. Additionally, as banking regulations are very tightly controlled, it is difficult to obtain information pertaining to an individual's bank account. This means tracking the money after the fraudulent activity has taken place can be very difficult. This is especially the case if the bank accounts in the fraudulent network are located in different countries.

Furthermore, typically, the fraudster will utilize a transaction which allows money to be transferred between various bank accounts very quickly and within a matter of seconds or minutes. As such, once a transaction has been reported as fraudulent, it is necessary to rapidly identify the accounts and transactions linked with that fraudulent transaction, such that action can be taken to frustrate the fraudster from preforming further fraudulent transactions.

According to the present embodiment, when a bank or financial institution engages in a transaction, the device associated with that financial institution identifies a set of previous messages or transactions with which the transaction is associated. For example, as the financial institution 1202 engages in a stream of transactions, the device 1204 determines quickly and substantially in real time the set of previous transactions with which each transaction is identified. As such, quickly and substantially in real time, the financial institutions build a graph of the dispersion of funds through the network. In this example, each financial institution within the network is therefore a node of the network. As described above, the skilled person in the art may consider the network as a graph and, therefore, may implement graph theory in analyzing the transactions between accounts in the network. Accordingly, a set of previous messages or transactions represents a tree of the dispersion of funds through the network, and may be referred to as a dispersion tree.

According to this embodiment of the disclosure, each financial institution constructs and stores only a portion of the dispersion tree that represents the flow of funds, via transactions between accounts, through the network 1200 as a whole. That is, in this example, the device 1204 associated with financial institution 1202 will know of and construct the portion of total dispersion tree of the network which relates to the transactions which financial institution 1202 has engaged in, while device 1208 will know of and construct the portion of the total dispersion tree of the network relating to the transactions in which financial institution 1206 has participated.

In response to a transaction being reported as a fraudulent transaction, the person interested in obtaining information regarding transactions related to that fraudulent transaction may therefore send a request across the network 1200. In response to receiving the request, the device connected to each financial institution may, as described in more detail below, provide information relating to the corresponding part of the dispersion tree which it holds. Accordingly, in this example, in response to a fraudulent transaction being reported, it is possible to rapidly identify any transactions or accounts related to a transaction or account which has been reported as being linked with fraudulent activity.

Owing to the method of tracing messages through a network of nodes according to the present embodiment, the requirement for a centralized database and device is removed. As such, even if a single node or nodes are unavailable (owing to system failure or the like) at least a portion of the dispersion tree relating to a transaction of interest can still be obtained. Accordingly, since there is no single point of failure in the network, the robustness of the network is improved. In addition, since the information corresponding to the messages, such as the transaction information according to the present example, is controlled at the local level by each individual financial institution, enhanced levels of privacy and network security can be obtained.

Furthermore, the method of tracing messages through a network of nodes according to the present embodiment requires no additional data sharing agreements between the nodes of the network, since the only additional information communicated across the network is the dispersion tree identifier. As such, the implementation costs and data sharing agreements required for tracing messages through a network of nodes is reduced.

The method according to the present embodiment will be described in more detail with reference to FIG. 13 below.

Tracing Messages Through a Network of Nodes:

FIG. 13 illustrates a method of tracing messages through a network of nodes according to the present embodiment of the disclosure. Step 1302 comprises receiving message information corresponding to a first outbound message, the message information comprising a first source identifier and a first destination identifier; step 1304 comprises determining whether the first source identifier is associated with a set of messages in a storage unit. Step 1306 comprises producing a trace request, the trace request comprising the first destination identifier and an identifier identifying the set of messages associated with the first source identifier when it is determined in step 1304 that the when the first source identifier is associated with a set of messages.

As described above, in the example depicted in FIG. 12, the messages referred to in FIG. 13 may relate to transactions between a network of bank accounts. In this case, a set of previous messages corresponds to a set of connected transactions tracking the dispersion of a set of funds through the accounts of the network. In such an example, the information contained in a transaction between the bank accounts of one or more financial institutions must include a source account identifier (identifying the account from which the transaction originates) a destination account identifier (identifying the account to which the transaction is made), the time of the transaction and a unique transaction identifier which can be used in order to identify the transaction.

Outbound Transaction

When a bank account associated with a financial institution 1202 generates a transaction, referred to as an outbound transaction, the transaction information is sent to the corresponding device 1204. Upon receiving this transaction information (step S1302), the device must then determine whether the source identifier (the account from which the transaction originates) is associated with a set of messages stored in the storage unit (step S1304). That is, the device will determine whether the account has transaction is to be associated with a previous dispersion of funds through the network.

When it is determined that the account is a traced account, that is, an account which is associated with a previous dispersion tree, then the device produces a trace request, the trace request comprising the first destination identifier (the account to which the message is being sent) and the dispersion tree identifier which is associated with the source identifier in the storage unit (step S1306). This trace request is subsequently sent to the financial institution receiving the transaction.

According to the present embodiment, for each message which is produced by a financial institution which is associated with a previous set of transactions, a corresponding trace request is produced which associates the destination account with that previous set of transactions.

As previously stated, in this example, the stream of transactions is consumed by each device (1204, 1208, 1212) as each transaction is generated quickly and substantially in real time. That is, a state is maintained at each device, mapping each account belonging to that financial institution to any corresponding dispersion trees. The mapping is stored in a storage unit A:

$A = a \rightarrow [tree\_id_1, tree\_id_2, \ldots ] a \in B$ where a is an unique identifier of a bank account, tree_id is a unique identifier of a dispersion tree and B is the sent of accounts which belong to the corresponding financial institution. Therefore, if there is an outbound transaction with an account identifier stored in a (being an account which belongs to the set of account associated with that financial institution), then the method according to the present embodiment comprises determining the dispersion tree identifiers associated with that transaction, and producing a trace request with the destination identifier and any dispersion identifiers associated with that transaction. It will be appreciated that where a source account identifier is associated with a plurality of dispersion tree identifiers, the trace request will comprise the destination identifier and each of the plurality of dispersion tree identifiers which are associated with the destination identifier in A. Furthermore, at this stage, the transaction is identified as belonging to the dispersion tree with which the source account has been identified. This identification could be stored at the source financial institution or the receiving financial institution.

In this manner, if an account is associated with a previous dispersion tree, the financial institution which receives the transaction will be informed of that association such that the dispersion of the funds throughout the network may be tracked quickly and substantially in real time. If further transactions are then sent from that destination account, then they will also be identified as belonging to the same dispersion tree as the original transaction and source identifier. In other words, by producing a trace request comprising a first destination identifier and a dispersion tree identifier as according to the present embodiment, the dispersion of funds through the network can be tracked locally at each node of the network leading to enhanced levels of privacy and network security.

Exemplary Modes of Tracking Dispersion:

In some exemplary applications of the present embodiment, the method may comprise tracking all dispersion of funds through the network. In this case, if the source account is not associated with a previous set of messages a trace request comprising the first destination identifier and the identifier identifying the new set of messages will be produced. That is, where the account from which the transaction is being sent is not associated with a previous dispersion tree, then it is determined that the transaction relates to a new dispersion of funds through the network and a new dispersion tree is created having a new dispersion tree identifier (that is, a new tree_id). The identifier for this new dispersion tree is then included in the trace request which is produced according to the present embodiment in response to the outbound transaction.

The new tree_id may be generated in accordance with transaction information corresponding to the outbound transaction. For example, the new tree_id may be generated based upon a unique transaction identifier identifying the received transaction or the like.

In this example, each transaction for which the source identifier is not already associated with a dispersion tree in the storage unit A of the given bank or financial institution is treated as a trace request. That is, for each transaction for which the source identifier is not already associated with a dispersion tree in the storage unit A, a new tree_id will be created.

In other exemplary applications of the present embodiment, it may only be required to trace the dispersion of funds through the network where those funds (or the account with which they are associated) have been identified as of particular interest. Such an exemplary application would be tracking only the dispersion of funds related to reported transactions or accounts (such as those which have been associated with fraudulent activity) through the network. In this case, if the source account of the outbound transaction is not associated with any previous dispersion tree, a trace request will not be produced. That is, a new tree_id will not be created, since the transaction between accounts is not a transaction of interest. In this manner, only dispersion of funds from accounts which have been indicated as accounts of interest will be traced through the network, reducing the total storage requirements of the network in order to trace the dispersion of funds through the network Inbound Transaction:

According to the present embodiment, the trace request (or information regarding the destination identifier and the dispersion tree identifier as described above) is produced in response to an outbound transaction (that is, a transaction initiated with the financial institution with which the device that generates the trace request is associated). As such, when the transaction is received at the financial institution which owns the bank account to which the transaction is being sent, that financial institution will also receive the trace request which was generated by the method according to FIG. 13 described above.

When a trace request is received, the method according to the present embodiment comprises storing an association between the account identifier and the dispersion tree contained in the trace request in the storage unit A of that financial institution. That is, when a trace request is received, the mapping between that account and dispersion tree is added to the mapping stored in the storage unit A. If that account is already associated with previous dispersion trees, then the new association is added to that previous association. In this manner, it will be appreciated that a given account may be identified as being associated with a plurality of dispersion trees. However, if that account is not already associated with any previous dispersion trees, then a new association will be created in the storage unit A.

In some examples according to the present embodiment, the receiving financial institution may store the identification of the received transaction in a storage unit. That is, a mapping between a unique identifier of the transaction, and the dispersion tree with which that transaction has been identified as belonging may be stored in a storage unit by the receiving financial institution or the device associated with that financial institution. However, as stated above, the storage of this identification could alternatively, or in addition, be stored by the financial institution or device linked to that financial institution from which the transaction was initiated.

In this manner, any further transactions which are sent from that account will also be associated with that previous dispersion tree.

Exemplary Transaction:

FIG. 14 illustrates an exemplary transaction between two financial institutions according to the present embodiment. In this example, a transaction is sent from a source bank account associated with financial institution 1400 to a destination bank account associated with financial institution 1404. In this example, the transaction relates to a transfer of funds from the source bank account to the destination bank account.

When the transaction is initiated, financial institution 1400 sends the outbound transaction information to the device 1402. As such, the device receives the outbound transaction information (that is, the transaction information related to the outbound transaction generated by financial institution 1400). Upon receiving the transaction information, the device then determines whether the source account identifier is associated with a previous dispersion tree. That is, the device performs a single lookup in the storage unit $A_1$ in order to determine whether any mapping exists between the source account identifier a and any tree_id stored in the storage unit. It will be appreciated that the method or function used in order to determine whether any mapping exists between the source account identifier and any dispersion tree identifier stored in the storage unit is not particularly limited in this respect.

In this example illustrated in FIG. 14, it is determined that a mapping does exist. That is, the source account identifier a is mapped to a tree_id in the storage unit. Accordingly, device 1402 produces a trace request comprising the destination account identifier and the tree_id which has been retrieved from the storage unit $A_1$. This trace request is then sent across the network, directly or indirectly, to the financial institution 1404 with the transaction information. That is, the device 1402 can either first inform financial institution 1400 of the trace request, and financial institution 1400 send the trace request to financial institution 1404, or the device 1402 can send the trace request to financial institution 1404 directly.

At this time, the transaction between the source bank account and the destination bank account is identified as belonging to dispersion tree identified by tree_id. In this example, this identification is then stored at a storage unit associated with financial institution 1400, however, in other examples, this identification may be stored in a storage unit associated with financial institution 1404.

When financial institution 1404 receives the transaction information, the corresponding trace request is sent to the device 1406. At this stage, the device 1406 then adds the mapping between the account identifier of the destination account and tree_id to the storage unit $A_2$. As such, any further transactions which are sent from that account will be associated with the tree_id. In this respect, it will be appreciated that the exemplary transactions illustrated with respect to FIG. 7 apply also to this present embodiment of the disclosure.

The method according to the present embodiment enables transactions to be traced through the network quickly and substantially in real time, while increasing the level of privacy and network security.

Moreover, owing to the method of tracing messages through a network of nodes according to the present embodiment, the requirement for a centralized database and device is removed. As such, even if a single node or nodes are unavailable (owing to system failure or the like) at least a portion of the dispersion tree relating to a transaction of interest can still be obtained. Accordingly, since there is no single point of failure in the network, the robustness of the network is improved. In addition, since the information corresponding to the messages, such as the transaction information according to the present example, is controlled at the local level by each individual financial institution, enhanced levels of privacy and network security can be obtained.

It will be appreciated that there is no particular limitation between the time when the financial institution 1400 informs the device 1402 of the transaction and the time of the transaction itself. The device 1400 may be provided with the message information before, concurrently or immediately after the transaction between financial institution 1400 and financial institution 1404 has been sent. That is, given that the method according to the present embodiment requires a single lookup in A in order to determine any tree_id associated with the source account identifier, the production of the trace request occurs on a timescale much shorter than that of the transaction between 1400 and 1404 itself. Accordingly, even if the device 1400 is provided with the transaction information immediately after the transaction is sent, a trace request can still be produced and sent to 1404 before the transaction itself has been processed. Therefore, even in this case, the dispersion can be traced in quickly and substantially in real time.

Furthermore, it will be appreciated that the method according to the present embodiment does not substantially increase the network traffic required in order to trace the dispersion through the network in the distributed manner. That is, in the example whereby the trace request is included with the transaction information, the only additional information which need be transmitted between the financial institutions is the tree_id which has been associated with the source account. As such, the implementation costs and data sharing agreements required for tracing messages through a network of nodes is reduced.

Trace Initiation

As described above, with reference to FIG. 13, in some examples of the present embodiment, the method comprises tracing all dispersion through the network. That is, for every transaction which is initiated a corresponding trace request is produced; when the source identifier is associated with a previous dispersion tree, this previous dispersion tree is included in the trace request, whereas when the source identifier is not associated with a previous dispersion tree a new dispersion tree identifier is created and included in the trace request. However, in other examples of the present embodiment, the method comprises only tracing the dispersion of transactions and funds where an account has been identified as an account of interest. In this example, if a transaction is sent from an account which is not associated with a previous dispersion tree, then no trace request will be produced.

It will be appreciated that an account of interest could, for example, be an account that has been linked to fraudulent activity such as fraudulent transactions or the like. The fraudulent activity could be identified by any method, and is not particularly limited in this respect. However, once an account has been identified as an account of interest, all transactions which are made from that account will be associated with a dispersion tree relating to the dispersion of funds from that account.

The initiation of the tracing of dispersion in response to an account being reported as fraudulent, or linked to fraudulent activity, according to the present embodiment is described with reference to FIG. 15, which illustrates a method of initiating a trace request according to the present embodiment of the disclosure. Step S1502 comprises receiving a trace initiation request, the trace initiation request comprising a second account identifier; Step S1504 comprises generating an identifier corresponding to a new set of messages and step S1506 comprises storing an association between the second account identifier and the new set of messages in the storage unit.

Method steps S1502 to S1506 will be described with reference to the example shown in FIG. 12 of the disclosure.

In this example, an account a is determined as being an account linked to fraudulent activity. In this example, this is determined by the financial institution 1202. Financial institution 1202 then reports that the account has been reported as fraudulent to the device 1204 in the form of a trace initiation request. The trace initiation request comprises a unique account identifier identifying the account which has been linked to the fraudulent activity. Upon receiving this account identifier the device 1204 according to the present embodiment subsequently generates an identifier corresponding to a new set of messages. That is, the method comprises generating a new tree_id with which to trace the dispersion of funds and transactions from that account.

The new tree_id may be generated in accordance with transaction information corresponding to the outbound transaction. For example, the new tree_id may be generated based upon a unique transaction identifier identifying the received transaction or the like.

Once the tree_id has been generated, the method then comprises storing an association between the reported account identifier from the trace initiation request with the tree_id linked to the new set of messages in the storage unit A linked to that financial institution. As such, any further transactions which are sent from that account will be associated as belonging to the same dispersion tree.

In this manner, a request can be made to trace the dispersion of funds from an account linked to suspicious or fraudulent activity. The dispersion from that account can then be traced quickly and substantially in real time in a distributed manner without the requirement for a central database according to the method of the present embodiment increasing the level of privacy and network security.

Application of a Timer:

According to the above described method, once an account has been identified as belonging to a given dispersion tree, any further transaction from that account will be identified as belonging to that dispersion tree also. As such, a transaction from that account which occurs even after an extended period of time, such as several weeks or months after, will be associated as also belonging to that dispersion tree.

However, in the example relating to the dispersion of funds through a banking network, as described above, typically, the fraudster will utilize a transaction which allows money to be transferred between various bank accounts very quickly such as within a matter of seconds or minutes for example. Therefore, in this situation, transactions which occur after a predetermined time has expired are not likely connected to the same dispersal of fraudulent funds through a network.

In accordance with the present embodiment, the method may further comprise setting a first timer which will remove the association between the first account identifier and the set of messages after a predetermined time. That is, according to the example illustrated in FIG. 14, when the trace request is received by financial institution 1404, and the mapping between the account identifier and tree_id in the trace request is created, then a timer is set which will remove the association between that account identifier and tree_id after a predetermined time has expired.

In certain examples, the timer which will remove the association between the account and the dispersion tree may be set to any value in period is between 24 and 148 hours. This period is statistically significant because this identifies the typically rapid diffusion of fraudulent transactions whilst ignoring the natural flow of non-fraudulent transactions such as utility bill payments or the like. Of course other periods of time are envisaged such as 12 hours as well as various periods within this advantageous range of 24 to 148 hours for example.

Accordingly, if further transactions are sent from that account after the predetermined time has elapsed, then those transactions will not be associated with the dispersion tree identified by tree_id. Rather, in the case of tracing all dispersion, a new dispersion tree and tree_id will be created and associated with that account.

Each mapping in A between an account identifier a and a dispersion tree identifier tree_id may be associated with its own timer. Furthermore, if a further trace request is received comprising the account identifier a and the dispersion tree identifier tree_id before the timer associated with that mapping has expired, then the timer associated with that mapping will be reset. As such, further transactions from that account will continue to be linked with that dispersion tree, since that account is still active within the dispersion tree.

When the timer expires, and the association between tree_id and a is removed, if it is determined that no further dispersion trees are associated with a in the storage unit A for that device, then a will also be removed from that storage unit. Use of the timer in this manner reduces the storage space required to trace messages through a network of nodes according to the present embodiment. It will be appreciated that storage of the identification between the transaction and the dispersion tree remains in the storage unit, such that the transactions associated with a given dispersion tree or set of previous transactions may be identified at a later stage as required.

Furthermore, using a timer to remove the association between the account and dispersion tree according to the present embodiment further improves the ability to track fraudulent transactions through a banking network quickly and substantially in real time, since only transactions which occur within a statistically significant period will be identified as belonging to the same dispersion tree.

Information Request:

The method according to the present embodiment of the disclosure enables the transactions or messages between a network of nodes to be traced quickly and substantially in real time without the need for a central node or database. That is, in the example of tracing all dispersion, each financial institution, or device linked to that financial institution, constructs and stores a portion of the total dispersion tree of the network of nodes. Referring to FIG. 12, for example, where a stream of transactions are sent and received between the financial institutions of the network. Device 1208 stores a mapping in the storage unit between accounts and dispersion trees in A only for those accounts which belong to the corresponding financial institution 1206. Furthermore, the identification of transactions as belonging to a given dispersion tree by device 1208 is only stored for transactions which are sent or received by the corresponding financial institution 1208.

At some time t into the stream of transactions, a transaction may be identified as being a fraudulent transaction, or be linked to some suspicious or fraudulent activity in some respect. At this stage, it is necessary to rapidly identify the dispersal of the funds from the fraudulent activity through the banking network, such that those accounts which are linked with the fraudulent activity can be identified and closed, for example, preventing the fraudsters from preforming any more transactions from that account.

Consider, for example, that financial institution 1202 determines that an account a has been linked with fraudulent activity, and wishes to determine all the transactions which are associated with that account. Financial institution 1202 can only retrieve from device 1204 the subset of those transactions which have been sent or received by the financial institution 1202, and can not ascertain all those accounts or transactions in the wider network which may be associated with that transaction by virtue of belonging to the same dispersion tree identified by a unique tree_id.

As such, at this stage, the method according to the device associated with that financial institution transmits an information request across the network. In this example of the present embodiment, the information request comprises the unique tree_id which the reported account has been identified as being associated with. It will be appreciated that where that account is associated with a plurality of dispersion tree identifiers in the storage associated with financial institution 1202, the information request will comprise the plurality of dispersion tree identifiers instead of the single tree_id.

Once an information request has been received, by device 1208 for example, then the method according to the present embodiment comprises producing a list of the account identifiers associated with that dispersion tree identifier in the storage unit. This list of accounts will then be reported back to the device 1204 of the financial institution 1202 which made the initiation request. Alternatively, or in addition, upon receiving the information request, the method according to the present embodiment may comprise producing a list of those transactions associated with the dispersion tree identifier in the received information request which are held by that financial institution or corresponding device, and returning that list to the device 1204 or the financial institution 1202 which made the initiation request.

It will be appreciated that the information request may comprise a unique account identifier of the account which has been reported as fraudulent. In this case, the unique account identifier is used to retrieve any related accounts or transactions from the financial institutions in the network Each device (1202, 1208, 1212) in the network receives the information request, and by producing a list of the associated accounts or transactions as according to the present embodiment, it is possible to construct the full dispersion tree for account throughout the network. That is, all those accounts or transactions which are associated with the fraudulent account or transaction can be rapidly identified.

That is, because the dispersion of funds through the network has been constructed quickly and substantially in real time using the method according to the present embodiment, when a transaction has been reported as fraudulent no further calculations are required in order to trace the dispersion of funds through the network. Rather, the connected transactions can simply be retrieved through a small number of lookups performed by each financial institution or associated device. Typically, owing to the limited number of lookups required in response to a fraudulent transaction being reported, the identification of the linked transactions can be performed in a matter of milliseconds. As such those accounts linked with the fraudulent transaction can be rapidly closed or deactivated in order to frustrate the fraudster from performing any further fraudulent transactions.

It will be appreciated that the level of disclosure which each financial institution wishes to provide in response to an information request can be determined by each financial institution, and this may vary in accordance with the entity which makes the information request. For example, if the information request originates from an institution with which the device receiving the information request has a high level of trust, then the device may provide additional transaction data with the list of linked accounts or transactions which further assist in the analysis of the fraudulent activity. In contrast, if there exists only a low level of trust, then only the minimum information need be provided. In other words, the distributed topology and network structure which are possible owing to the method of the present embodiment provide a graduated level of access permission enhancing the level of privacy and control afforded to each financial institution, or node, in the network.

Furthermore, the method according to the present embodiment can be provided in a decentralized manner, without the requirement of a centralized database. As such, even if a single node or nodes are unavailable (owing to system failure or the like) at least a portion of the dispersion tree relating to a transaction of interest can still be obtained. Accordingly, since there is no single point of failure in the network, the robustness of the network is improved. In addition, since the information corresponding to the messages, such as the transaction information according to the present example, is controlled at the local level by each individual financial institution, enhanced levels of privacy and network security can be obtained.

Additional Modifications of the Embodiment:

While the present embodiment has been described with examples relating to fraudulent transactions throughout the network, it will be appreciated that the method according to the present embodiment is not so limited in this respect. That is, the messages according to the present embodiment could relate to any type of financial transaction between bank accounts or financial institutions made by any method such as Faster Payments, BACS transfers or the like. Alternatively, the method according to the present embodiment could be used to construct a set of traceable messages with relation to any message or transaction, and is not so limited to financial transactions. For example, the method according to the present embodiment could be applied to building a set of traceable messages through a mobile communications network or the like.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Embodiments of the present disclosure may be defined by the following clauses.

1) A method of tracing messages through a network of nodes, the method comprising:

receiving message information corresponding to a first outbound message, the message information comprising a first source identifier and a first destination identifier;

determining whether the first source identifier is associated with a set of messages in a storage unit; whereby when the first source identifier is associated with a set of messages, the method comprises producing a trace request, the trace request comprising the first destination identifier and an identifier identifying the set of messages associated with the first source identifier.

2) The method according to Clause 1, the method further comprising:

receiving a trace request, the trace request comprising a first account identifier and an identifier identifying a set of messages; and storing an association between the first account identifier and the set of messages in the storage unit.

3) The method according any preceding Clause, wherein the method further comprises:

receiving a trace initiation request, the trace initiation request comprising a second account identifier;

generating an identifier corresponding to a new set of messages;

storing an association between the second account identifier and the new set of messages in the storage unit.

4) The method according to any preceding Clause, whereby when the first source identifier is not associated with a set of messages, the method further comprises:

generating an identifier corresponding to a new set of messages;

producing a trace request, the trace request comprising the first destination identifier and the identifier identifying the new set of messages.

5) The method according to Clause 4, wherein the identifier corresponding to a new set of messages is generated in accordance with the message information corresponding to the outbound message.

6) The method according to any preceding Clause, whereby when a trace request is produced, the method further comprises identifying the outbound message as belonging to the set of messages associated with the first source identifier.

7) The method according to Clause 3, further comprising receiving a trace initiation request when an account has been identified as a fraudulent account.

8) The method according to any preceding Clause, further comprising setting a first timer which will remove the association between the first account identifier and the set of messages after a predetermined time.

9) The method according to Clause 8, whereby when producing or receiving a trace request comprising the first account identifier before the predetermined time has expired, the method further comprises resetting the first timer associated with the first account identifier.

10) The method according to Clause 5, wherein identifying the outbound message as belonging to the set of messages associated with the set of messages further comprises storing a mapping of the outbound message to the set of messages in the storage unit.

11) The method according to any preceding Clause, wherein when the first source identifier is associated with a plurality of sets of messages, the method comprises producing a trace request, the trace request comprising the first destination identifier and a plurality of identifiers identifying each set of messages associated with the first source identifier.

12) The method according to any preceding Clause, the method further comprising receiving an information request, the information request comprising an identifier identifying a set of messages and producing a list of the account identifiers associated with that set of messages identifier in response to the information request.

13) The method according to any preceding Clause, the method further comprising receiving an information request, the information request comprising an account identifier and producing a list of the set of messages associated with that account identifier in response to the information request.

14) An apparatus for building a set of traceable messages through a network of nodes, the apparatus comprising:

communication circuitry configured to receive message information corresponding to a first outbound message, the message information comprising a first source identifier and a first destination identifier;

and processing circuitry configured to determine whether the first source identifier is associated with a set of messages in a storage unit; whereby when the first source identifier is associated with a set of messages, the processing circuitry is configured to produce a trace request, the trace request comprising the first destination identifier and an identifier identifying the set of messages associated with the first source identifier.

15) A computer program product comprising instructions which, when the program is executed by a computer, cause the computer to carry out a method of tracing messages through a network of nodes, the method comprising:

receiving message information corresponding to a first outbound message, the message information comprising a first source identifier and a first destination identifier;

determining whether the first source identifier is associated with a set of messages in a storage unit; whereby when the first source identifier is associated with a set of messages, the method comprises producing a trace request, the trace request comprising the first destination identifier and an identifier identifying the set of messages associated with the first source identifier.

The invention claimed is:

1. An apparatus for building a set of traceable messages through a network of nodes, the apparatus comprising:

communication circuitry configured to receive message information corresponding to a first outbound message, the message information comprising a first source identifier and a first destination identifier;

and processing circuitry configured to:

determine that the first source identifier is associated with a set of messages in a storage unit;

produce a trace request, the trace request comprising the first destination identifier and an identifier identifying the set of messages associated with the first source identifier; and identify the outbound message as belonging to the set of messages associated with the first source identifier.

2. A method of tracing messages through a network of nodes, the method comprising:

receiving message information corresponding to a first outbound message, the message information comprising a first source identifier and a first destination identifier;

determining whether the first source identifier is associated with a set of messages in a storage unit; whereby when the first source identifier is associated with a set of messages, the method comprises producing a trace request, the trace request comprising the first destination identifier and an identifier identifying the set of messages associated with the first source identifier;

receiving the trace request, the trace request comprising the first source identifier and the identifier identifying the set of messages; and storing an association between the first source identifier and the set of messages in the storage unit.

3. The method according to claim 2, wherein the method further comprises:

receiving a trace initiation request, the trace initiation request comprising a second source identifier;

generating an identifier corresponding to a new set of messages;

storing an association between the second source identifier and the new set of messages in the storage unit.

4. The method according to claim 3, further comprising receiving the trace initiation request when an account has been identified as a fraudulent account.

5. The method according to claim 2, whereby when the trace request is produced, the method further comprises identifying the outbound message as belonging to the set of messages associated with the first source identifier.

6. A method of tracing messages through a network of nodes, the method comprising:

receiving message information corresponding to a first outbound message, the message information comprising a first source identifier and a first destination identifier;

determining whether the first source identifier is associated with a set of messages in a storage unit whereby when the first source identifier is associated with a set of messages, the method comprises producing a trace request, the trace request comprising the first destination identifier and an identifier identifying the set of messages associated with the first source identifier; whereby when the trace request is produced, the method further comprises identifying the outbound message as belonging to the set of messages associated with the first source identifier.

7. A non-transitory computer program product comprising instructions which, when the program is executed by a computer, cause the computer to carry out a method of tracing messages through a network of nodes, the method comprising:

receiving message information corresponding to a first outbound message, the message information comprising a first source identifier and a first destination identifier;

determining the first source identifier is associated with a set of messages in a storage unit;

producing a trace request, the trace request comprising the first destination identifier and an identifier identifying the set of messages associated with the first source identifier; and identifying the outbound message as belonging to the set of messages associated with the first source identifier.

8. A method of tracing messages through a network of nodes, the method comprising:

receiving message information corresponding to a first outbound message, the message information comprising a first source identifier and a first destination identifier;

determining whether the first source identifier is associated with a set of messages in a storage unit; whereby when the first source identifier is associated with a set of messages, the method comprises producing a trace request, the trace request comprising the first destination identifier and an identifier identifying the set of messages associated with the first source identifier; and setting a first timer which will remove the association between the first source identifier and the set of messages after a predetermined time.

9. The method according to claim 8, whereby when producing or receiving a trace request comprising the first source identifier before the predetermined time has expired, the method further comprises resetting the first timer associated with the first source identifier.

10. The method according to claim 8, wherein the first source identifier is associated with a plurality of sets of messages, the step of producing the trace request comprising producing the trace request, wherein the trace request comprises the first destination identifier and a plurality of identifiers identifying each set of messages associated with the first source identifier.

11. The method according to claim 10, the method further comprising receiving an information request, the information request comprising the identifier identifying the set of messages and producing a list of account identifiers associated with the identifier in response to the information request.

12. The method according to claim 10, the method further comprising receiving an information request, the information request comprising an account identifier and producing a list of the set of messages associated with that account identifier in response to the information request.

13. A method of tracing messages through a network of nodes, the method comprising:
   receiving message information corresponding to a first outbound message, the message information comprising a first source identifier and a first destination identifier;
   determining whether the first source identifier is associated with a set of messages in a storage unit whereby
   when the first source identifier is associated with a set of messages, the method comprises producing a trace request, the trace request comprising the first destination identifier and an identifier identifying the set of messages associated with the first source identifier;
   receiving an information request, the information request comprising an account identifier and producing a list of the set of messages associated with that account identifier in response to the information request.

14. A method of tracing messages through a network of nodes, the method comprising:
   receiving message information corresponding to a first outbound message, the message information comprising a first source identifier and a first destination identifier;
   determining whether the first source identifier is associated with a set of messages in a storage unit; whereby
   when the first source identifier is associated with a set of messages, the method comprises producing a trace request, the trace request comprising the first destination identifier and an identifier identifying the set of messages associated with the first source identifier;
   receiving a trace initiation request, the trace initiation request comprising a second source identifier;
   generating an identifier corresponding to a new set of messages; and
   storing an association between the second source identifier and the new set of messages in the storage unit.

15. The method according to claim 14, further comprising receiving a trace initiation request when an account has been identified as a fraudulent account.

16. A method of tracing messages through a network of nodes, the method comprising:
   receiving message information corresponding to a first outbound message, the message information comprising a first source identifier and a first destination identifier;
   determining whether the first source identifier is associated with a set of messages in a storage unit whereby
   when the first source identifier is associated with a set of messages, the method comprises producing a trace request, the trace request comprising the first destination identifier and an identifier identifying the set of messages associated with the first source identifier; whereby
   when the first source identifier is not associated with a set of messages, the method comprises generating an identifier corresponding to a new set of messages; and
   producing a trace request, the trace request comprising the first destination identifier and the identifier identifying the new set of messages.

17. The method according to claim 16, wherein the identifier corresponding to a new set of messages is generated in accordance with the message information corresponding to the outbound message.

18. The method according to claim 17, wherein identifying the outbound message as belonging to the set of messages associated with the set of messages further comprises storing a mapping of the outbound message to the set of messages in the storage unit.

19. A method of tracing messages through a network of nodes, the method comprising:
   receiving message information corresponding to a first outbound message, the message information comprising a first source identifier and a first destination identifier;
   determining whether the first source identifier is associated with a set of messages in a storage unit; whereby
   when the first source identifier is associated with a set of messages, the method comprises producing a trace request, the trace request comprising the first destination identifier and an identifier identifying the set of messages associated with the first source identifier;
   receiving an information request, the information request comprising the identifier identifying the set of messages and producing a list of account identifiers associated with the identifier in response to the information request.

* * * * *